(12) United States Patent
Fujinawa et al.

(10) Patent No.: US 8,061,850 B2
(45) Date of Patent: Nov. 22, 2011

(54) ILLUMINATING DEVICE AND PROJECTOR DEVICE TO BE MOUNTED INTO ELECTRONIC APPARATUS

(75) Inventors: Nobuhiro Fujinawa, Yokohama (JP); Hirotake Nozaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/604,045

(22) Filed: Oct. 22, 2009

(65) Prior Publication Data
US 2010/0039624 A1 Feb. 18, 2010

Related U.S. Application Data

(62) Division of application No. 11/217,423, filed on Sep. 2, 2005, now Pat. No. 7,625,091.

(30) Foreign Application Priority Data

| Sep. 6, 2004 | (JP) | 2004-258466 |
| Dec. 17, 2004 | (JP) | 2004-365883 |
| Feb. 15, 2005 | (JP) | 2005-037335 |
| Mar. 8, 2005 | (JP) | 2005-063948 |

(51) Int. Cl.
*G03B 21/16* (2006.01)
*G03B 21/20* (2006.01)
*F21V 29/00* (2006.01)

(52) U.S. Cl. ............ 353/52; 353/119; 353/122; 353/85; 362/294

(58) Field of Classification Search .......... 353/52, 353/119, 122, 87, 85; 362/294, 362
See application file for complete search history.

(56) References Cited

U.S. PATENT DOCUMENTS

| 4,729,076 | A | 3/1988 | Masami et al. |
| 5,857,767 | A | 1/1999 | Hochstein |
| 6,905,214 | B2 * | 6/2005 | Tani ................ 353/56 |
| 7,078,728 | B2 | 7/2006 | Ishii et al. |
| 7,192,163 | B2 * | 3/2007 | Park ................ 362/294 |
| 7,285,802 | B2 * | 10/2007 | Ouderkirk et al. ......... 257/98 |
| 7,497,596 | B2 * | 3/2009 | Ge ................ 362/294 |

(Continued)

FOREIGN PATENT DOCUMENTS

JP  2000-194275  7/2000

(Continued)

OTHER PUBLICATIONS

U.S. Appl. No. 11/217,423, filed Sep. 2, 2005, Illuminating Device and Projector Device, Nikon Corporation, Tokyo, Japan.

(Continued)

*Primary Examiner* — Georgia Y Epps
*Assistant Examiner* — Magda Cruz
(74) *Attorney, Agent, or Firm* — Staas & Halsey LLP

(57) ABSTRACT

A projector module adopts a structure having an optical image forming block and an optical block integrated via a locking member. The optical image forming block adopts a structure achieved by disposing an aluminum substrate at which an LED is mounted and a liquid crystal panel in a casing constituted with a plastic material having low thermal conductivity. The locking member is formed by bending a metal sheet through a sheet metal bending process and the locking member is set in surface contact with the substrate. The optical block adopts a structure achieved by disposing a PBS and a reflecting member at the casing constituted with a plastic material having low thermal conductivity with a quarter-wave plate disposed at the boundary of the two members.

7 Claims, 25 Drawing Sheets

U.S. PATENT DOCUMENTS

| | | |
|---|---|---|
| 2001/0030866 A1 | 10/2001 | Hochstein |
| 2002/0085390 A1 | 7/2002 | Kiyomoto et al. |
| 2004/0057027 A1 | 3/2004 | Tani |
| 2004/0062044 A1 | 4/2004 | Hanano |
| 2005/0023538 A1 | 2/2005 | Ishii et al. |

FOREIGN PATENT DOCUMENTS

| | | |
|---|---|---|
| JP | 2000-236375 | 8/2000 |
| JP | 2001-142024 | 5/2001 |
| JP | 2001-160312 | 6/2001 |
| JP | 2001-221641 | 8/2001 |
| JP | 2002-516044 | 5/2002 |
| JP | 2002-232015 | 8/2002 |
| JP | 2003-104086 | 4/2003 |
| JP | 2003-218397 | 7/2003 |
| JP | 2004-004581 | 1/2004 |
| JP | 2004-061779 | 2/2004 |
| JP | 2004-069825 | 3/2004 |
| JP | 2004-070163 | 3/2004 |
| JP | 2004-94115 | 3/2004 |
| JP | 2004-193002 | 7/2004 |
| JP | 2004-246055 | 9/2004 |
| JP | 2004-325604 | 11/2004 |
| JP | 2005-005437 | 1/2005 |
| JP | 2005-050838 | 2/2005 |
| WO | WO 98/13725 | 4/1998 |

OTHER PUBLICATIONS

Office Action mailed Nov. 2, 2007 in U.S. Appl. No. 11/217,423.
Office Action mailed Feb. 26, 2008 in U.S. Appl. No. 11/217,423.
Office Action mailed Nov. 13, 2008 in U.S. Appl. No. 11/217,423.
Office Action mailed Apr. 16, 2009 in U.S. Appl. No. 11/217,423.
Communication mailed Mar. 5, 2009 in U.S. Appl. No. 11/217,423.
Notice of Allowance mailed Aug. 3, 2009 in U.S. Appl. No. 11/217,423.
Japanese Office Action issued Jul. 13, 2010 in corresponding Japanese Patent Application 2004-365883.
Notification of Reasons for Refusal mailed on Aug. 10, 2010 in corresponding Japanese Patent Application No. 2005-063948.
Notification of Reasons for Refusal mailed on Sep. 7, 2010 in corresponding Japanese Patent Application No. 2004-258466.
Japanese Office Action for corresponding Japanese Application 2005-037335; dated Oct. 26, 2010.

* cited by examiner

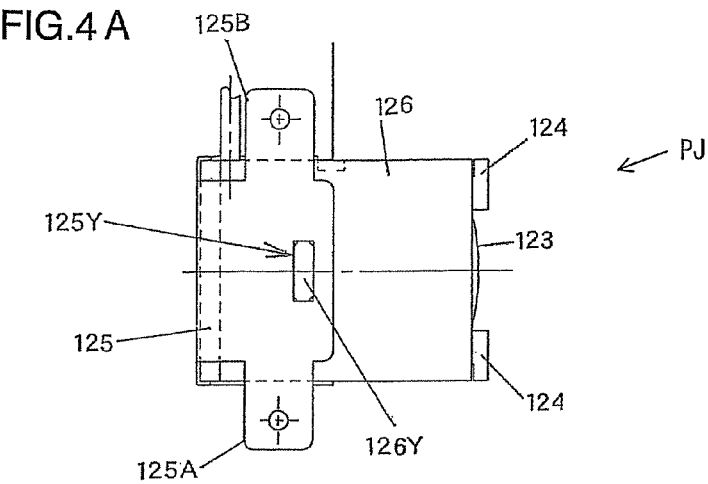
FIG.4 A
FIG.4 B
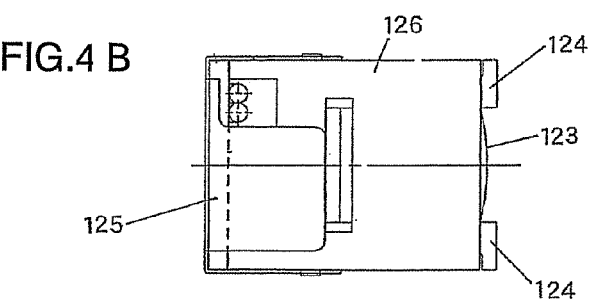
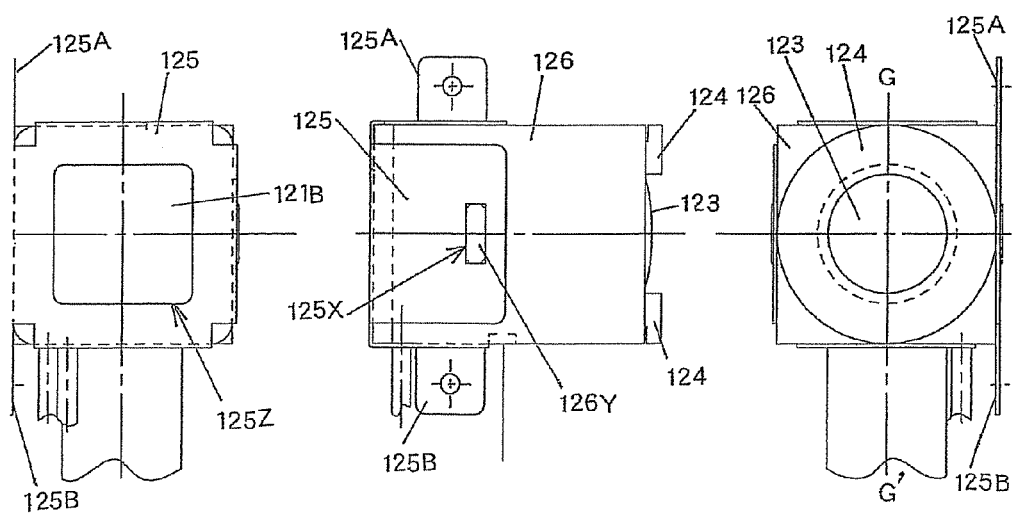
FIG.4 C  FIG.4 D  FIG.4 E

ILLUMINATING DEVICE AND PROJECTOR DEVICE TO BE MOUNTED INTO ELECTRONIC APPARATUS

CROSS REFERENCE TO RELATED APPLICATIONS

This application is a divisional of U.S. application Ser. No. 11/217,423, filed Sep. 2, 2005 now U.S. Pat. No. 7,625,091, now allowed, which also claimed priority of Japanese Patent Application No. 2004-258466 filed Sep. 6, 2004, Japanese Patent Application No. 2004-365883 filed Dec. 17, 2004, Japanese Patent Application No. 2005-037335 filed Feb. 15, 2005, and Japanese Patent Application No. 2005-063948 filed Mar. 8, 2005, of which disclosures of the above-mentioned priority applications are herein incorporated by reference.

BACKGROUND

1. Field

The present invention relates to an illuminating device and a projector device that use a light emitting element as a light source.

2. Description of Related Art

Japanese Laid Open Patent Publication No. 2000-194275 discloses an image display device (projector) having a liquid crystal display (LCD) constituted with a liquid crystal panel or the like and a light source for illuminating the LCD, which projects an image formed with light (modulated light) having been transmitted through the LCD. An LED with a high level of brightness is used as the light source in this device. The device can be provided as a more compact unit since it employs an LED rather than a halogen lamp or a xenon lamp. It also achieves an advantage in that on/off control of the light source is facilitated. However, it is necessary to supply a large electrical current to the LED in order to increase the brightness with which light is emitted at the LED, and unless appropriate measures are taken against the heat generated at the LED, the LED may become damaged by its own heat.

SUMMARY

A projector device to be mounted in an electronic apparatus according to a first aspect of the present invention includes a first member constituted of a thermally conductive material, at which a light emitting device is disposed; a light modulating member that modulates light originating from the light emitting device; a projection optical system that projects an image formed with the light modulated by the light modulating member; a second member constituted of a material with a lower level of thermal conductivity compared to the first member, at which the first member and the light modulating member are disposed; and a third member constituted of a material with a high level of thermal conductivity compared to the second member, that supports the second member and the projection optical system as an integrated unit and comes into surface contact with the first member.

In the projector device to be mounted in an electronic apparatus according to the first aspect, it is preferable that the second member is formed in a prismatic shape so as to enclose a passing light flux; and the third member is bent so as to fit along an outer surface of the prism-shaped second member. The first member may be disposed at a position of a bottom surface of the prism-shaped second member; and the third member may come into surface contact with the first member at the position of the bottom surface.

In the projector device to be mounted in an electronic apparatus according to the first aspect, it is preferable that the second member hold the light modulating member at a position away from the third member, and the third member should include a mounting portion to be used to mount the projector device in the electronic apparatus. A separating portion disposed at the second member, that separates a space toward the first member from a space toward the light modulating member may further be provided.

An illuminating device to be mounted into an electronic apparatus, that directs light generated at a light emitting device to an outside according to a second aspect of the present invention includes a metal substrate that comprises a mounting surface at which the light emitting device is mounted; and a metal heat transfer block that comes into surface contact with a rear side of the mounting surface corresponding to a mounting position of the light emitting device, and a sum of a thickness of the metal substrate and a length of the heat transfer block along a direction perpendicular to the mounting surface is greater than a distance from the mounting position of the light emitting device to an end of the mounting surface.

In the illuminating device according to the second aspect, the metal substrate and the heat transfer block may come into surface contact via a thermally conductive member.

An illuminating device to be mounted into an electronic apparatus, that directs light generated at a light emitting device to an outside according to a third aspect of the present invention includes a metal heat transfer block that comprises a mounting surface at which the light emitting device is mounted, and a length of the heat transfer block along a direction perpendicular to the mounting surface is greater than a distance from a mounting position of the light emitting device to an end of the mounting surface.

In the illuminating device according to the second or third aspect, it is preferable that the heat transfer block include as an integrated part thereof one of a positioning portion used to determine a position of the illuminating device relative to the electronic apparatus and a mounting portion used to mount the illuminating device in the electronic apparatus.

The illuminating device according to the second or third aspect may further include an image forming unit that receives the light from the light emitting device and forms projection light for image projection; and a projection unit that projects the projection light formed at the image forming unit to the outside. It is preferable that an integrated unit be constituted by stacking the heat transfer block, the light emitting device, the image forming unit and the projection unit along a single direction and an optical axis of the projection light run along a direction perpendicular to the single direction.

An illuminating device that emits light generated at a light emitting device according to a forth aspect of the present invention includes a metal mounting substrate at which the light emitting device is mounted; and a casing in which the mounting substrate having the light emitting device mounted thereat is housed, and the mounting substrate is disposed at a metal portion of the casing so as to release heat generated at the light emitting device to an outside via the mounting substrate and the casing.

In the illuminating device according to the forth aspect, it is preferable that a rear side of the mounting substrate at which the light emitting device be mounted is set in complete contact with the metal portion of the casing either directly or via a thermally conductive member. It is preferable that the metal portion coming into complete contact with the mounting substrate be a bottom portion of the casing; and the illuminating device further include a light path altering member disposed inside the casing, that bends the light radiated upward from the light emitting device and directs the bent light to the outside along a substantially horizontal direction.

An illuminating device that emits light generated at a light emitting device according to a fifth aspect of the present invention includes a casing that houses the light emitting device and comprises a metal portion at which the light emitting device is mounted.

In the illuminating device according to the fifth aspect, it is preferable that the metal portion at which the light emitting device is mounted be a bottom portion of the casing; and the illuminating device further include a light path altering member disposed inside the casing, that bends the light radiated upward from the light emitting device and directs the bent light to an outside along a substantially horizontal direction.

The illuminating device according to the forth or fifth aspect, may further include an image forming unit that receives the light from the light emitting device and forms projection light for image projection; and a projection optical system that projects the projection light formed at the image forming unit to the outside along a substantially horizontal direction via the light path altering member. The illuminating device according to the forth or fifth aspect may further include heat radiating fins formed at an outer surface of the casing at a position corresponding to the light emitting device.

An illuminating device that emits light generated at a light emitting device according to a sixth aspect includes a metal mounting substrate to be positioned substantially parallel to an installation surface at which the illuminating device is installed, with the light emitting device mounted on an upper surface of the metal mounting substrate; and a casing that covers the mounting substrate so as to expose part of a lower surface facing opposite the installation surface.

In the illuminating device according to the sixth aspect, it is preferable that the casing forms a gap between the mounting substrate and the installation surface. The casing may allow the gap between the mounting substrate and the installation surface to be varied. Alternatively, the casing may allow an angle formed by the mounting substrate and installation surface to be varied.

A projector device according to a seventh aspect of the present invention includes an illuminating device according to the sixth aspect; an optical image forming device that forms an optical image by modulating the light from the illuminating device; a light path altering member that alters a light path; and a projection optical system that projects the optical image formed by the optical image forming device.

According to the first through seventh aspect, the light emitting device is an LED.

BRIEF DESCRIPTION OF THE DRAWINGS

FIGS. 4A through 4E present five views of the projector module achieved in a second embodiment, with FIG. 4A presenting a rear view, FIG. 4B presenting a bottom view, FIG. 4C presenting a left side elevation, FIG. 4D presenting a front view and FIG. 4E presenting a right side elevation;

DETAILED DESCRIPTION OF EMBODIMENTS

First Embodiment

The following is an explanation of a projector device achieved in the first embodiment of the present invention, given in reference to drawings. In the first embodiment, a projector device is mounted at a portable telephone which is an electronic apparatus.

Figure 1A:
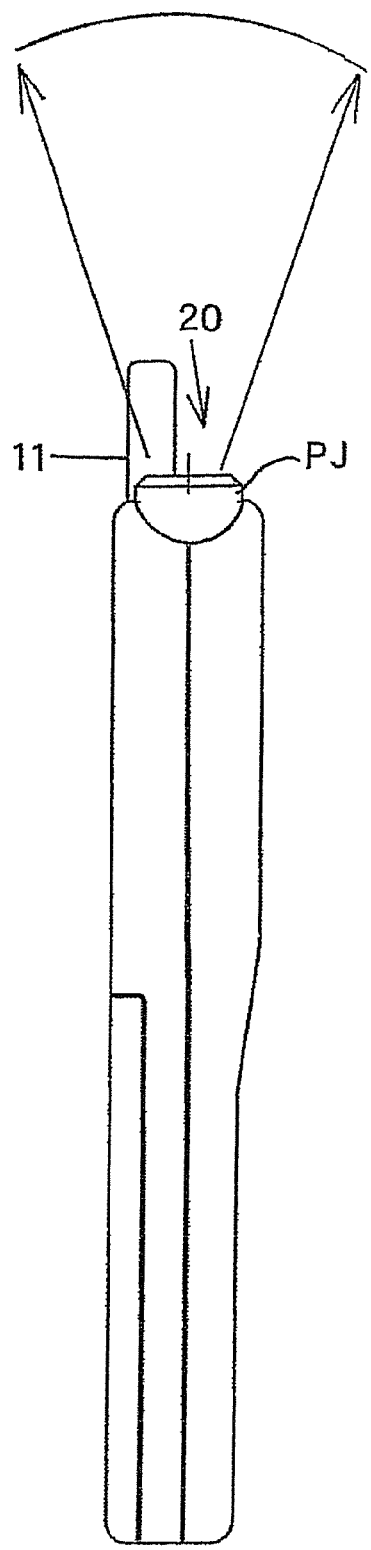
FIGS. 1A and 1B present external views of a portable telephone equipped with a projector achieved in a first embodiment of the present invention, with FIG. 1A presenting a side elevation and FIG. 1B presenting a front view.
Figure 1B:
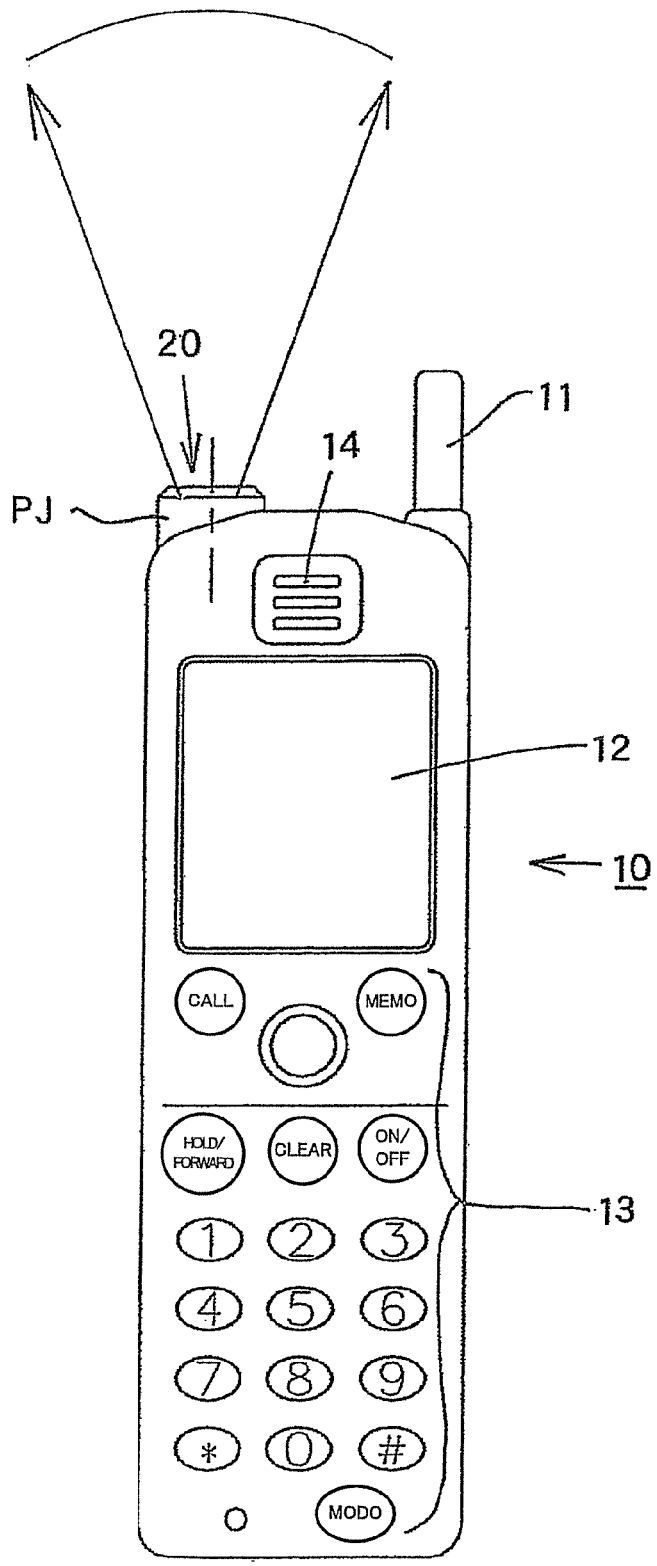

FIGS. 1A and 1B present external views of a handheld-type portable telephone equipped with a projector, achieved in the first embodiment of the present invention, with FIG. 1A presenting a side elevation and FIG. 1B presenting a front view. The portable telephone 10 includes an antenna 11, a liquid crystal display 12, an operating member 13 which includes a dial button and the like, ventilating holes 14 and a projector projecting port 20. The portable telephone 10 is used to exchange e-mail, data and the like as well as to make/receive a telephone call to/from another telephone via a base station (not shown). In addition, it is equipped with a projector device to be detailed later, which projects an image, a received e-mail or the like displayed at the liquid crystal display 12 toward a wall or the like through the projector projecting port 20. The projector device in the first embodiment is constituted with a projector module.

Since the first embodiment is characterized by the structure of the projector module mounted at the portable telephone 10, the following explanation focuses on the projector module.

Figure 2B:
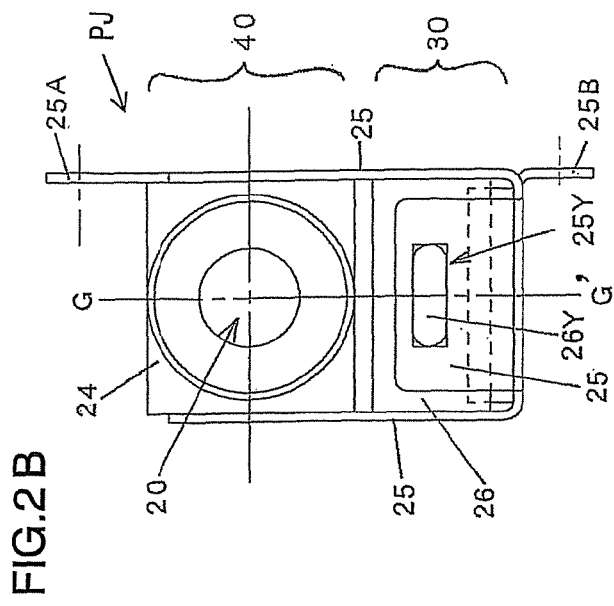
FIGS. 2A through 2C present three views of a projector module, with FIG. 2A presenting a front view, FIG. 2B presenting a side elevation and FIG. 2C presenting a bottom view.
Figure 2A:
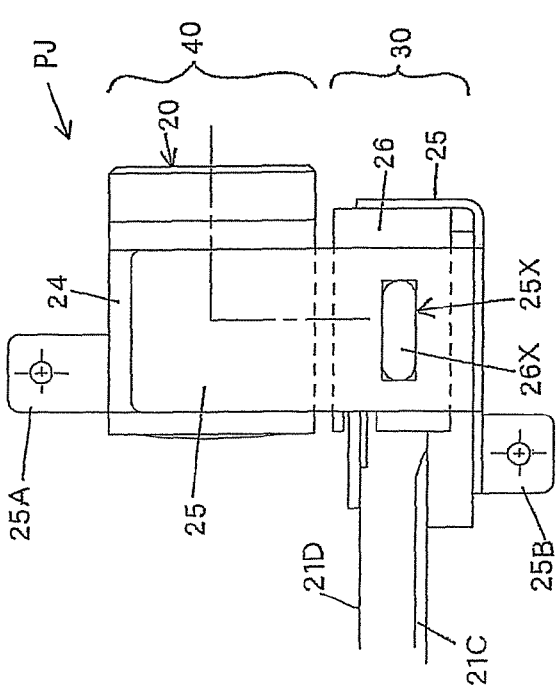
Figure 2C:
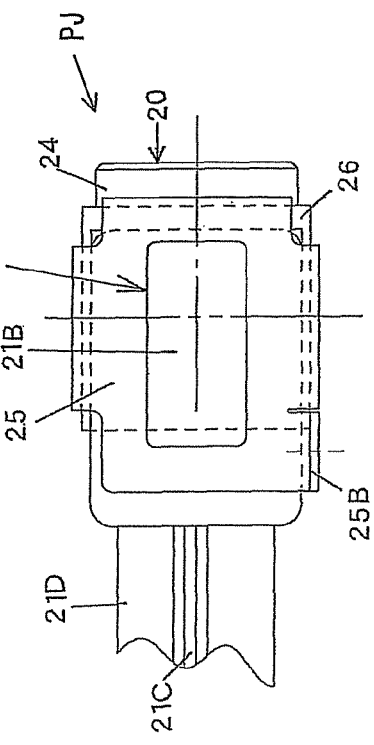

FIGS. 2A through 2C present three views of the projector module PJ, with FIG. 2A presenting a front view, FIG. 2B presenting a side elevation and FIG. 2C presenting a bottom view. The projector module PJ comprises an optical block 40 (projection optical system) and an optical image forming block 30, which are integrated via a locking member 25 (third member). The locking member 25 may be formed by bending a metal sheet such as an aluminum plate through a sheet metal bending process. The locking member 25 includes mounting portions 25A and 25B each having formed therein a threaded retaining hole, and the projector module PJ is locked inside a casing of the portable telephone 10. The mounting portions 25A and 25B function as mounting margins.

Figure 3:
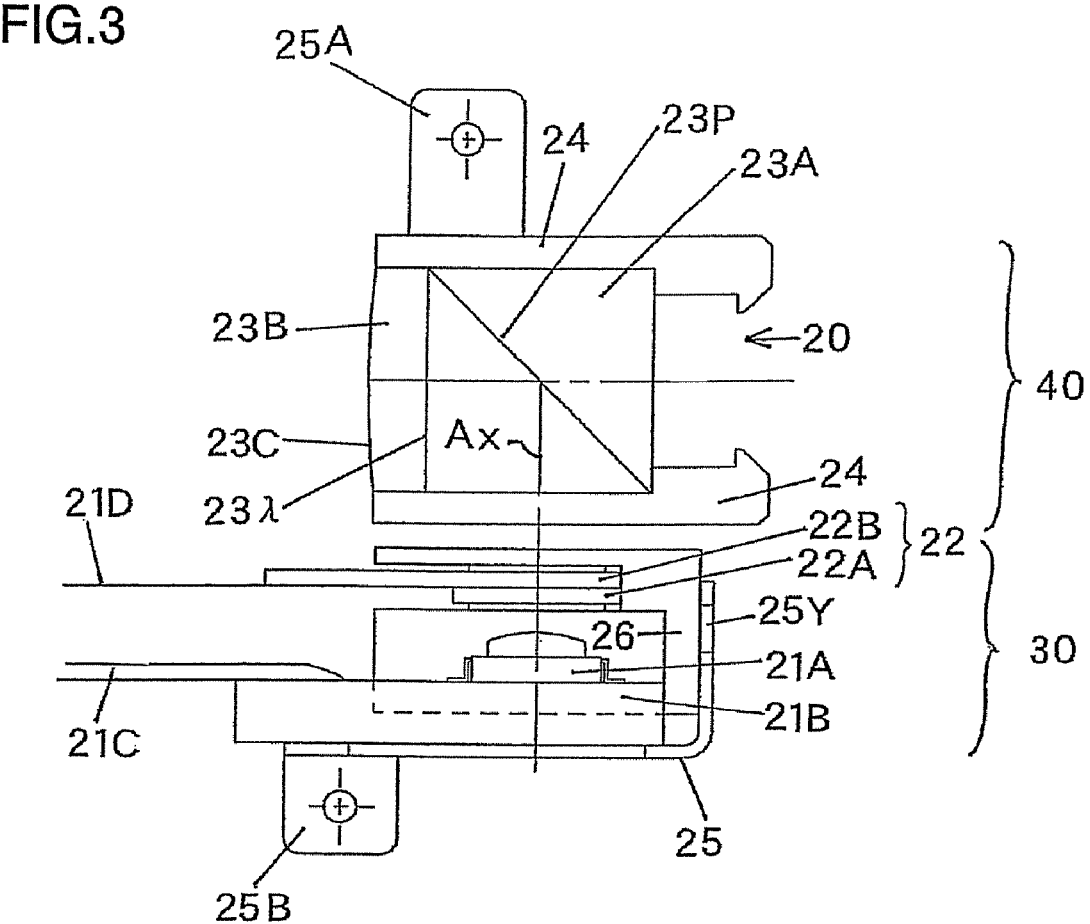
FIG. 3 is a sectional view of the projector module.

FIG. 3 is a sectional view taken along G-G' in FIG. 2B. The optical image forming block 30 is constituted by disposing a substrate 21B (first member) in an optical image forming block casing 26 (second member). The casing 26 is formed by using a material such as plastic with low thermal conductivity. The substrate 21B is an aluminum substrate, and a white-color LED 21A capable of emitting very bright light is mounted on a pattern formed on an insulating layer present on an LED mounting surface of the substrate 21B. The LED 21A illuminates a liquid crystal panel 22 at a brightness corresponding to the level of the electrical current supplied thereto via a harness 21C. The liquid crystal panel 22 is constituted by sealing liquid crystal between glass plates 22A and 22B. It is to be noted that the liquid crystal panel 22 may be either a color display or a monochrome display. The LED 21A functions as a light emitting element or light emitting device, whereas the liquid crystal panel 22 functions as a light valve or light modulating member that modulates the light originating from the light emitting element 21A, i.e., as a light modulating member. The light emitting element used in the embodiment may be, for instance, an organic EL or an LED.

The liquid crystal panel 22 is driven by a drive signal provided via a flexible substrate 21D to reproduce an image, text (characters) or the like. For instance, by driving the liquid crystal panel 22 with a drive signal similar to a display signal (drive signal) provided to the liquid crystal display 12, an image matching the display contents at the liquid crystal display 12 can be formed at the liquid crystal panel 22. More specifically, a voltage corresponding to the density at each pixel in the image is applied to the liquid crystal layer. As such voltages are applied to the liquid crystal layer, the arrangement of the liquid crystal molecules changes, causing a change in the transmittance of the light at the liquid crystal layer. By modulating the light from the LED 21A in conformance to the drive signal as described above, an optical image is generated at the liquid crystal panel 22. The light flux having been transmitted through the liquid crystal panel 22 advances upward in FIG. 3 and enters the optical block 40.

The optical block 40 includes a polarizing beam splitter (hereafter referred to as a PBS) 23A and a reflecting member 23B disposed in an optical block casing 24, with a quarter-wave plate 23 λ disposed at the boundary between the PBS 23A and the reflecting member 23B. The casing 24 is formed by using a material such as plastic with a low level of thermal conductivity.

The light flux having entered the optical block 40 then enters the PBS 23A through the bottom side in FIG. 3, and an S polarized component in the incident light is reflected at a polarization splitting portion 23P to advance to the left. The reflected light flux having advanced to the left exits the PBS 23A and is reflected at a reflected surface 23C of the reflecting member 23B via the quarter-wave plate 23λ. The reflecting light flux then reenters the PBS 23A via the quarter-wave plate 23λ. The light flux having reentered the PBS 23A will have been converted to a P-polarized light component as it has passed through the quarter-wave plate 23λ twice. Thus, it is transmitted through the polarization splitting portion 23P of the PBS 23a to advance to the right.

The transmitted light flux having advanced to the right exits the PBS 23A to advance to the right and is projected through the projector projecting port 20. As a result, the optical image formed at the liquid crystal panel 22 is projected toward a screen or the like. It is to be noted that the reflecting surface 23C is formed as a curved surface achieving a specific shape so as to preclude the necessity for providing a separate projection lens.

As shown in FIGS. 2A through 2C, the locking member 25 clamps the substantially rectangular parallelepiped optical image forming block 30 on four surfaces. Explicitly, it is conjoined with the corresponding surfaces of the optical image forming block 30 so as to cover the optical image forming block 30 from four directions, from the left, from the bottom and from the right in FIG. 2B and also from above the drawing sheet surface (along the direction perpendicular to the drawing sheet surface). A hole 25X (see FIG. 2A) and a hole 25Y (see FIG. 2B) are formed at the surface facing front in FIG. 2A and the surface facing front in FIG. 2B respectively among the surfaces of the locking member 25 conjoined with the optical image forming block 30. These holes 25X and 25Y are formed so as to interlock respectively with a projecting portion 26× and a projecting portion 26Y of the casing 26 of the optical image forming block 30 when the optical image forming block 30 is held by the locking member 25. Thus, the locking member 25 and the optical image forming block 30 can be provided as an integrated unit without having to use screws, an adhesive or the like.

In addition, among the surfaces of the locking member 25 conjoined with the optical image forming block 30, the surface facing front in FIG. 2C is formed specifically to achieve surface contact with the lower surface of the substrate 21B and is conjoined after a thermally conductive packing material (such as a silicon grease) is applied thereto. Also, at this particular surface of the locking member 25, a hole 25Z is formed so as to partially expose the substrate 21B when the optical image forming block 30 is clamped by the locking member 25.

With the locking member 25 and the optical image forming block 30 conjoined as described above, the substantially rectangular parallelepiped optical block 40 is clamped by the locking member 25 on two surfaces, as shown in FIGS. 2A and 2B. Namely, the locking member 25 is conjoined with surfaces of the optical block 40 from the left and from the right in FIG. 2B. The optical block 40 is structured so that the optical block 40 clamped by the locking member 25 is allowed to slide freely along the locking member 25 along the optical axis Ax in FIG. 3, i.e., along the upward/downward direction in FIGS. 2A and 2B. As the optical block 40 slides along the upward/downward direction in FIGS. 2A and 2B, the focus of the image projected by the projector module PJ is adjusted. It is to be noted that the fine adjustment mechanism that causes the optical block 40 to slide in small increments is not included in the illustrations presented in FIG. 2. Thus, the locking member 25 and the optical block 40, as well as the locking member 25 and the optical image forming block 30, can be provided as an integrated unit without having to use screws, an adhesive or the like.

When the projector module PJ formed as an integrated unit as described above is locked to the casing of the portable telephone 10, the exposed portion of the substrate 21B is set at a position immediately inward relative to the ventilating holes 14 (see FIG. 1) of the portable telephone 10.

The following operational effects can be achieved in the first embodiment described above.

(1) The projector module PJ includes the optical image forming block 30 and the optical block 40 which are integrated via the locking member 25. The optical image forming block 30 is constituted by disposing the aluminum substrate 21B at which the LED 21A is mounted and the liquid crystal panel 22 at the casing 26 formed by using a plastic material with low thermal conductivity. The casing 26 holds the liquid crystal panel 22 at a position distanced from the locking member 25 so as to disallow ready transfer of the heat generated at the LED 21A to the liquid crystal panel 22. As a result, the temperature of the liquid crystal panel 22 is not allowed to rise.

(2) The white-color LED 21A, capable of emitting very bright light is mounted on the metal substrate 21B with a higher thermal conductivity than a substrate made of, e.g., a resin or plastic material, and thus, the heat generated at the LED 21A can be quickly transmitted to the substrate 21B. This, in turn, prevents an increase in the temperature of the apparatus to a level exceeding the allowable range. In particular, the quantity of heat generated at the LED 21A increases when the LED 21A generates bright light, and for this reason, it is critical that the heat releasing effect be improved in order to protect the LED 21A from rising temperatures.

(3) The locking member 25 is formed by bending a metal sheet through a sheet metal bending process, and the locking member 25 and the substrate 21B are made to achieve surface contact with each other. As a result, the heat transmitted to the substrate 21B can then be efficiently radiated through the locking member 25.

(4) The hole 25Z is formed so as to partially expose the substrate 21B at a surface of the locking member 25 which comes in contact with the substrate 21B. This also allows the heat to be directly released from the substrate 21B.

(5) The optical block 40 is constituted by disposing the PBS 23A and the reflecting member 23B at the casing 24 formed by using a plastic material with a low level of thermal conductivity and then by disposing the quarter-wave plate 23A at the boundary between the PBS 23A and the reflecting member 23B. Since very little of the heat transferred from the optical image forming block 30 to the locking member 25 is transferred to the PBS 23A and the reflecting member 23B present inside the optical block 40, degradation in the quality of the projected image attributable to thermal expansion can be prevented.

(6) The locking member 25 and the optical image forming block 30 are integrated by clamping the substantially rectangular parallelepiped optical image forming block 30 with the locking member 25 at four surfaces so as to cover the optical image forming block 30 and by causing the hole 25X (see FIG. 2A) and the hole 25Y (see FIG. 2B) formed at two of the surfaces of the locking member 25 conjoined with the optical image forming block 30 to interlock respectively with the projecting portion 26X and the projecting portion 26Y present at the casing 26 of the optical image forming block 30 when the optical image forming block 30 is clamped by the locking member 25. Since this eliminates the need for screws, an adhesive or the like, the assembly work efficiency improves and the locking member 25 and the optical image forming block 30 can be provided as an integrated unit with ease. In addition, with the locking member 25 achieving a high level of thermal conductivity covering the exterior of the optical image forming block 30, the heat releasing effect is further improved.

(7) The locking member 25 and the optical block 40 are integrated by clamping the substantially rectangular parallelepiped optical block 40 with the locking member 25 on two surfaces and allowing the clamped optical block 40 to slide along the locking member 25 along the optical axis Ax in FIG. 3, i.e., along the upward/downward direction in FIGS. 2A and 2B. As the optical block 40 slides, the focus of the image projected by the projector module PJ can be adjusted with ease.

It is desirable that the projector module PJ be locked at the casing of the electronic apparatus by using the mounting portions 25A and 25B so as to come into surface contact (surface-to-surface contact) with a chassis or the like achieving a high level of thermal conductivity, since the heat releasing effect can be further enhanced with the heat conducted from the optical image forming block 30 to the locking member 25 further transferred to the chassis.

If the electronic apparatus at which the projector module PJ is mounted does not include a metal chassis, surface contact should be achieved between a backlight heat releasing member, which releases heat generated at a backlight (not shown) of the liquid crystal display 12 (see FIG. 1), and the mounting portions 25A and 25B of the projector module PJ.

Alternatively, the mounting portions 25A and 25B may achieve surface contact with a heat releasing member or the like for the power transistor, instead of the backlight heat releasing member.

Second Embodiment

FIGS. 4A to 4E present five-view diagrams of a projector module PJ achieved in the second embodiment of the present invention, with FIG. 4A presenting a rear view, FIG. 4B presenting a bottom view, FIG. 4C presenting a left side elevation, FIG. 4D presenting a front view and FIG. 4E presenting a right side elevation. The second embodiment differs from the first embodiment in that the optical block and the optical image forming block are constituted as a single block. The module constituted as a single block is then integrated with a locking member 125 (third member). The locking member 125 may be formed by bending a metal sheet such as an aluminum plate through a sheet metal bending process. The locking member 125 includes mounting portions 125A and 125B (mounting margins) each having formed therein a threaded retaining hole, and the projector module PJ is locked in a casing of the electronic apparatus via the mounting portions 125A and 125B.

Figure 5:
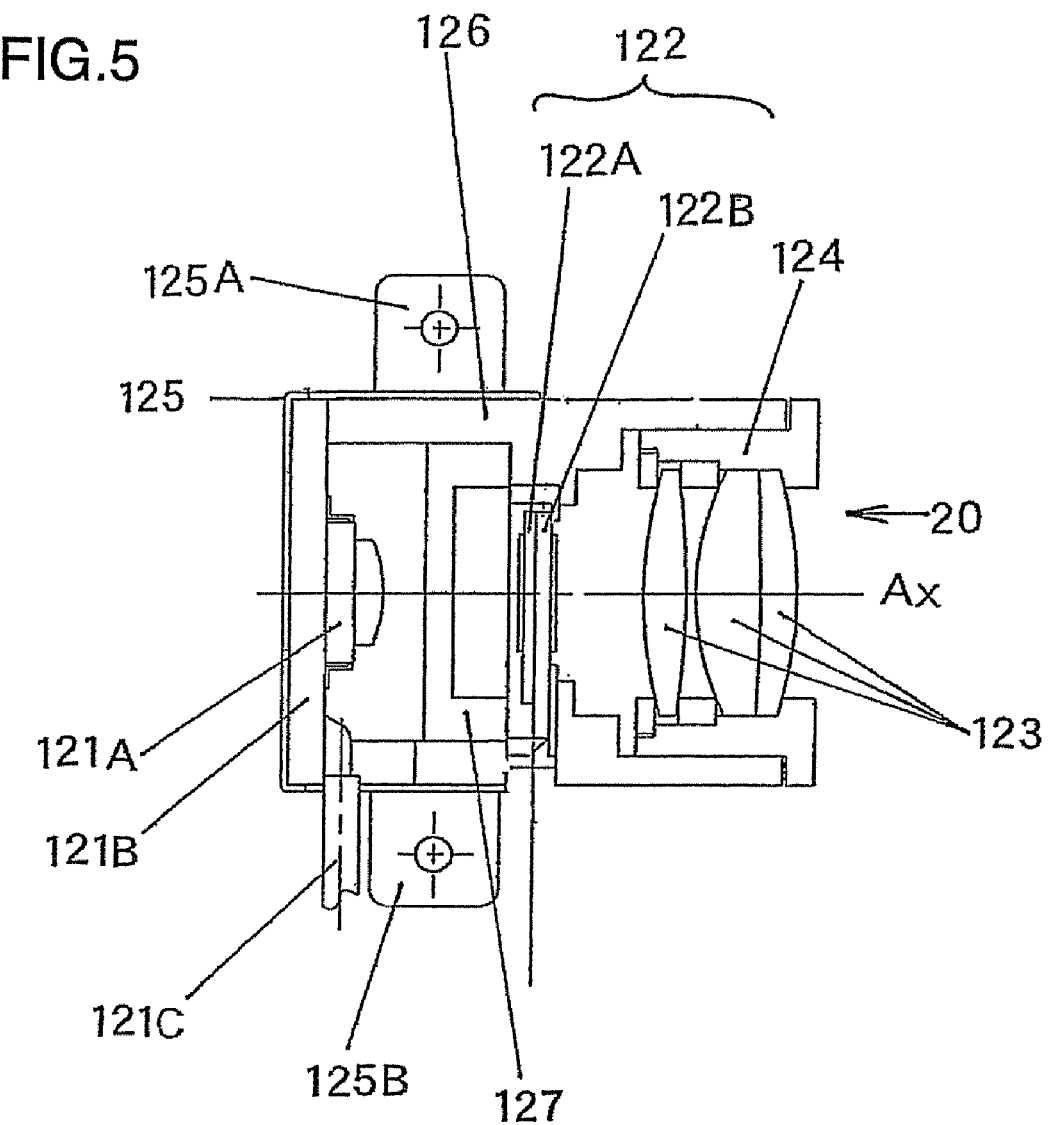
FIG. 5 is a sectional view of the projector module.

FIG. 5 is a sectional view taken along G-G' in FIG. 4E. FIG. 5 shows that a substrate 121B is disposed at a casing 126 (second member). The casing 126 is formed by using a material such as plastic with low thermal conductivity. The substrate 121B (first member) is an aluminum substrate and a white-color LED 121A (light emitting device) capable of emitting bright light is mounted on a pattern formed on the substrate 121B. The LED 121A illuminates a liquid crystal panel 122 (light valve or light modulating member) at a brightness corresponding to the level of the electrical current supplied thereto via a harness 121C. The liquid crystal panel 122 is constituted by sealing liquid crystal between glass plates 122A and 122B. It is to be noted that the liquid crystal panel 122 may be either a color display or a monochrome display.

A condensing member 127 (separation means) is disposed between the LED substrate 121B (LED 121A) and the liquid crystal panel 122. The condensing member 127 is a Fresnel lens formed by using a resin material, which also has a function of dividing the space inside the casing 126 into separate spaces, i.e., a space toward the LED 121A and a space toward the liquid crystal panel 122. The liquid crystal panel 122 is driven by a drive signal used to reproduce an image, text or the like. As the light from the LED 121A is modulated in conformance to the drive signal, an optical image is generated at the liquid crystal panel 122. The light flux having been transmitted through the liquid crystal panel 122 advances to the right in FIG. 5 to enter a lens 123. The lens 123 functions as a projection optical system in this structure.

The light flux having entered the lens 123 is condensed and exits through the projector projecting port 20. The lens 123 is a lens group constituted with a plurality of lenses disposed inside a lens barrel 124. A screw thread is formed at the external circumference of the lens barrel 124, which interlocks with a screw thread formed at the internal circumference of the casing 126. As the lens barrel 124 is rotated around the optical axis Ax in FIG. 5, the lens 123 is driven to advance/retreat along the optical axis Ax and the focus of the image projected by the projector module PJ is adjusted.

As shown in FIGS. 4A through 4C, the locking member 125 clamps the substantially rectangular parallelepiped casing 126 on five surfaces. Explicitly, it is conjoined with the corresponding surfaces of the casing 126 so as to cover the casing 126 from five directions, from the left, from the bottom, from the right and from the top in FIG. 4C and also from above the drawing sheet surface (along the direction perpendicular to the drawing sheet surface). A hole 125Y (see FIG. 4A) and a hole 125X (see FIG. 4D) are formed at the surface facing front in FIG. 4A and the surface facing front in FIG. 4D respectively among the surfaces of the locking member 125 conjoined with the casing 126. These holes 125Y and 125X are formed so as to interlock respectively with a projecting portion 126Y and a projecting portion 126X of a casing 126 when the casing 126 is held by the locking member 125. Thus, the locking member 125 and the casing 126 can be provided as an integrated unit without having to use screws, an adhesive or the like.

In addition, among the surfaces of the locking member 125 conjoined with the casing 126, the surface facing front in FIG. 4C is formed specifically to achieve surface contact with the substrate 121B and is conjoined after a thermally conductive packing material (such as a silicon grease) is applied thereto. Also, at this particular surface of the locking member 125, a hole 125Z is formed so as to partially expose the substrate 121B when the locking member 125 clamps the casing 126.

It is desirable that as the projector module PJ formed as an integrated unit as described above is locked at the casing of the electronic apparatus, the exposed portion of the substrate 121B be set at a position near the ventilating holes of the electronic apparatus.

The following operational effects can be achieved in the second embodiment described above.

(1) Since the optical block (lens 123) and the optical image forming block (casing 126) are constituted as a single block, the projector module PJ can be provided as a more compact unit compared to a projector module that includes a plurality of blocks.

(2) The condensing member 127 divides the space inside the casing 126 into separate spaces, i.e., a space toward the LED 121A and a space toward the liquid crystal panel 122. As a result, heat generated on the LED side is not allowed to be transmitted toward the liquid crystal panel side through diffusion of the heat in the internal air.

The condensing member 127 may be a diffusive member. In such a case, the effective area at the liquid crystal panel 122 is evenly illuminated so as to achieve a high image quality in the projected image by minimizing any inconsistencies in brightness over the entire projected image plane.

While the locking member 125 clamps the substantially rectangular parallelepiped casing 126 on five surfaces, it may hold the casing 126 on three surfaces or four surfaces instead of five surfaces. It should be ensured, however, that the locking member 125 clamps the casing 126 on at least three surfaces, i.e., two surfaces facing opposite each other and a surface ranging perpendicular to the two surfaces. For instance, the locking member 125 may be conjoined with corresponding surfaces of the casing 126 from three directions, i.e., from the left and from the right in FIG. 4C and also from above the drawing sheet surface, so as to cover the casing 126 on the three sides.

While an explanation is given above on an example in which the casing 126 assumes a rectangular parallelepiped shape, i.e., the shape of a quadrangular prism, the casing 126 may instead be formed in the shape of a pentagonal prism or a hexagonal prism.

The condensing member 127 may also be used in conjunction with the projector module PJ achieved in the first embodiment.

While the projector module PJ is mounted on the handheld portable telephone 10 in the example explained above, it may instead be mounted at a portable electronic apparatus other than the portable telephone 10, such as a laptop computer, a PDA, an electronic camera, or a playback apparatus.

Figure 6:
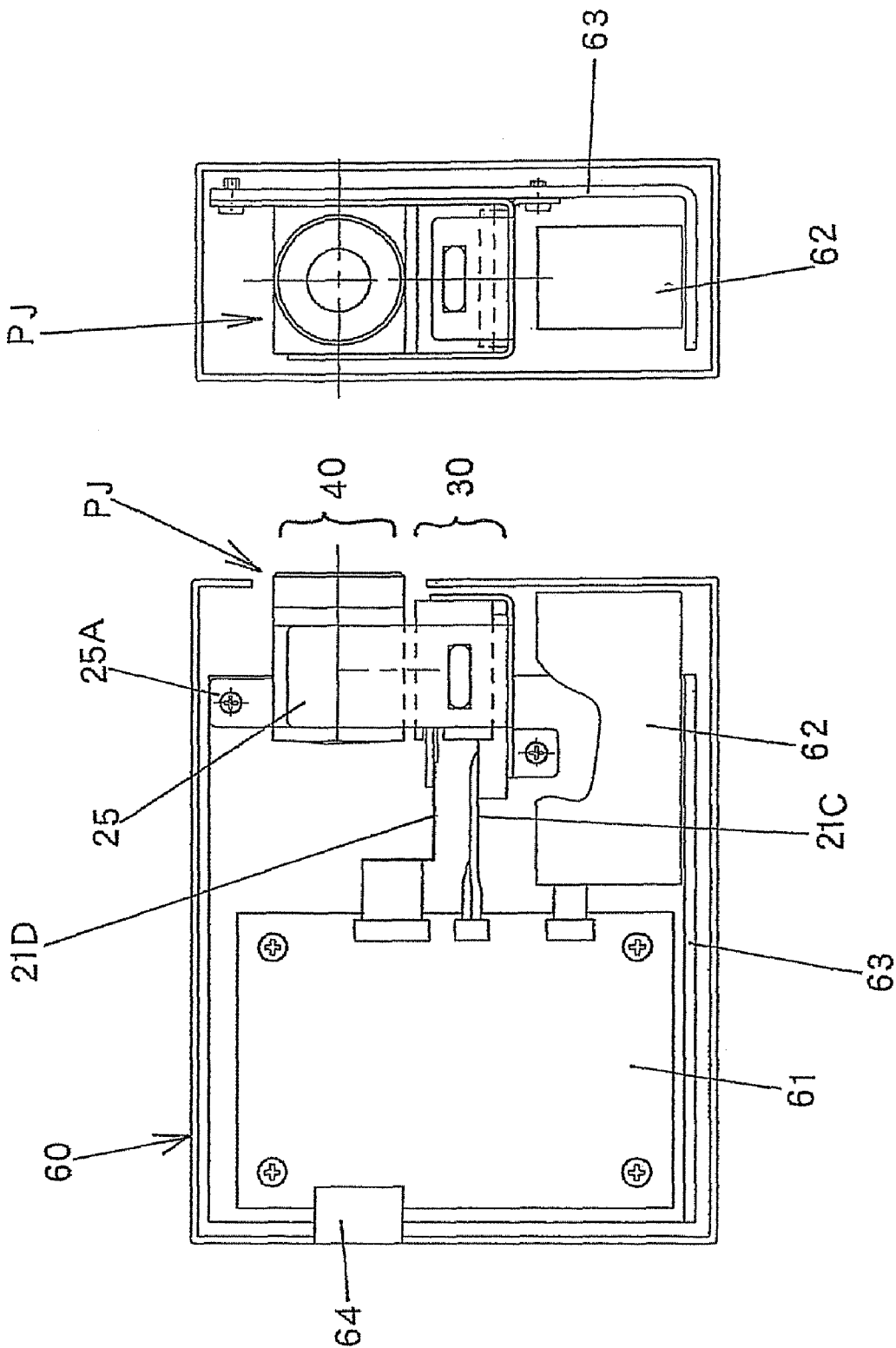
FIGS. 6A and 6B show an internal arrangement of a projector device, with FIG. 6A presenting a plan view and FIG. 6B presenting a side elevation.

In addition, instead of providing the projector module in conjunction with another electronic apparatus, a projector device having only the projecting function of the projector module PJ may be provided. FIGS. 6A and 6B show the internal arrangement of a projector device, with FIG. 6A presenting a plan view and FIG. 6B presenting a side elevation. A chassis 63 is disposed inside a casing 60, and a main substrate 61, a power supply unit 62 and a projector module PJ are disposed on the chassis 63. The projector module PJ includes the locking member 25, the optical image forming block 30 and the optical block 40.

The power source unit 60 provides power to the main substrate 61. As an image signal is input from an external apparatus via an interface connector 64, a liquid crystal drive circuit (not shown) formed on the main substrate 61 provides a drive signal to the liquid crystal panel 22 of the optical image forming block 30 via a harness 21D and an LED drive circuit (not shown) supplies a drive current to the LED 21A via a harness 21C.

While an explanation is given above in reference to the first and second embodiments on an example in which a white light source is used as the projector light source, the present invention may also be adopted in conjunction with color (a plurality of colors) light sources used as the light source for a liquid crystal panel with monochrome display capability. Namely, LEDs that emit light in different colors may be turned on sequentially through time division and as the LEDs emit different colors of light, the liquid crystal panel may be driven sequentially through time division with image signals (drive signals) each corresponding to a given color of light. The optical images in the various colors sequentially projected through time division will be observed by the user as a color image. The plurality of colors may be the three primary colors, R (red), G (green) and B (blue) or they may be Y (yellow) and B (blue).

In the first and second embodiments described above, the light emitting device is disposed at the first member achieving a high level of thermal conductivity, the first member and the light valve or light modulating member are disposed at the second member that does not have high thermal conductivity, the second member and the projection optical system are supported as an integrated unit by the thermally conductive third member, and the first member and the third member are made to achieve surface contact. As a result, the heat generated at the light emitting device is released through the first member and the third member and, at the same time, it is ensured that the heat is not transferred readily to the light valve. The structure assures a high level of heat releasing performance without having to use a Peltier element or the like and makes it possible to provide a compact projector device to be mounted at an electronic apparatus.

The following is an explanation of an illuminating device achieved in the third embodiment of the present invention. The illuminating device in the third embodiment is constituted as a liquid crystal projector module.

Figure 7:
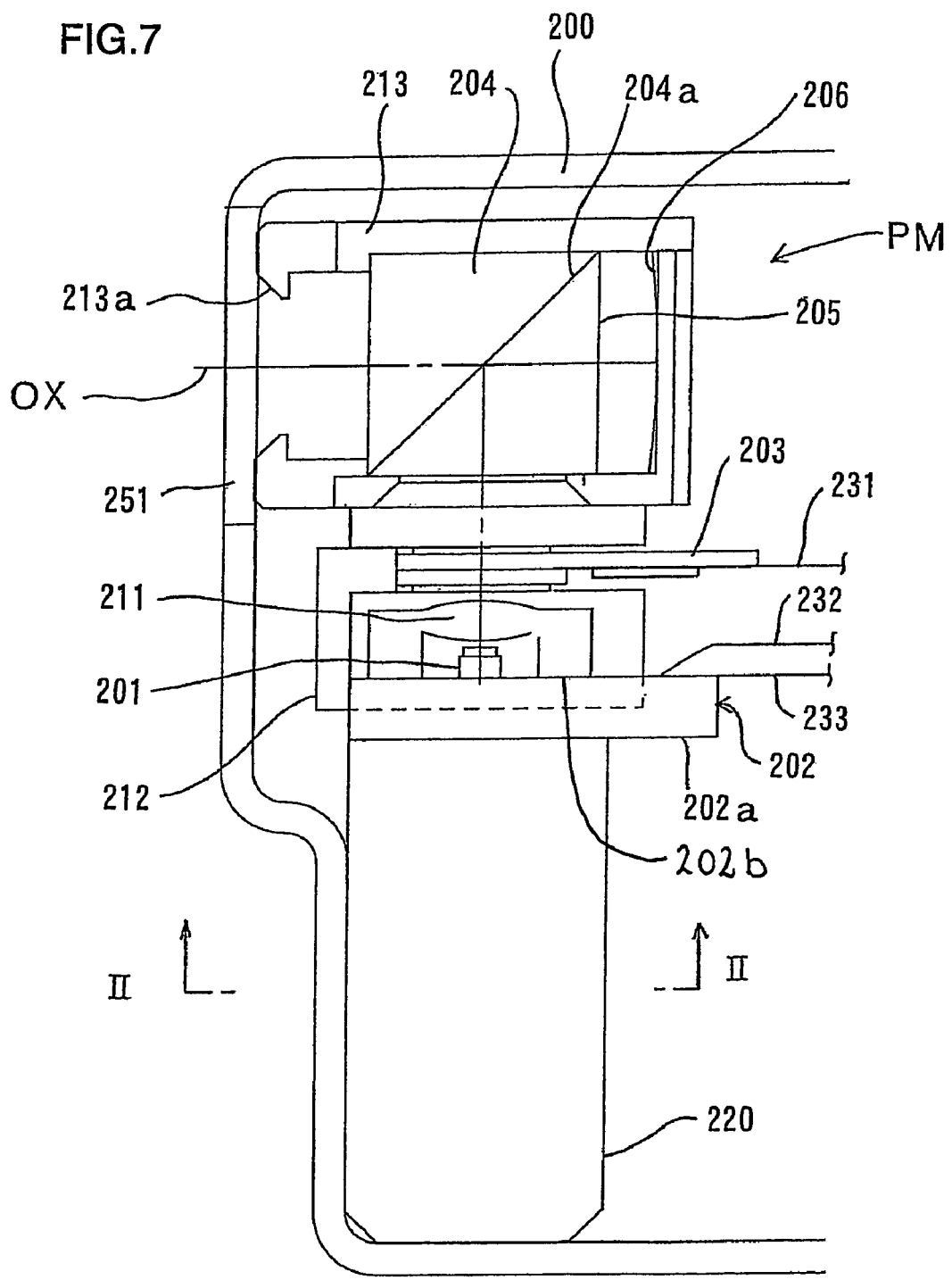
FIG. 7 illustrates the projector module achieved in a third embodiment, fitted into a casing of an electronic apparatus.

FIG. 7 shows the liquid crystal projector module PM achieved in the third embodiment, which is fitted in an electronic apparatus. The projector module PM is a compact unit, and the electronic apparatus into which the projector module is fitted may be a digital camera, a portable telephone or the like as well as a compact projector device. A casing 200 of the electronic apparatus is constituted of a thermally conductive metal such as die-cast aluminum.

The projector module PM includes a light source unit, an image forming unit, a projection unit and a heat transfer unit that are integrated into a single component in advance. A high output LED 201 used as the light source is mounted at an LED substrate 202 constituted of metal. The LED substrate 202 may be constituted by forming a conductive circuit with a copper pattern on the top surface of, for instance, an aluminum plate via a thermally conductive insulating layer, and a surface of the conductive circuit is used as the mounting surface 202b at which the LED 201 is mounted. At a surface (lower surface) 202a of the LED substrate 202, located on the opposite side from the mounting surface 202b, a metal portion is exposed.

A light projector lens 211 is disposed over the LED substrate 202, a liquid crystal panel 203 constituting an image forming member is disposed at a frame 212 provided as an integrated part of the LED substrate 202, and a polarizing beam splitter (PBS) 204 constituting a projection unit is disposed further upward via a frame 213. A PBS film 204a forms a 45° angle relative to the optical axis of the LED light. A quarter-wave plate 205 and a reflecting mirror 206 are disposed further rear word relative to the PBS 204 (to the right in the figure), and the reflecting surface of the mirror 206 may be formed as a spherical surface or a non-spherical surface. It is to be noted that reference numeral 231 indicates an electrical wiring through which the liquid crystal panel 203 is controlled, and reference numerals 232 and 233 each indicate an electrical wiring through which the LED 201 is controlled.

As an image is formed at the liquid crystal panel 203 and the LED 201 is turned on, the light from the LED is transmitted through the liquid crystal panel 203 via the lens 211, thereby forming projection light for image projection. The projection light reaches the PBS 204 and is reflected rearward at the PBS film 204a. After passing through the quarter-wave plate 205, the reflected light is further reflected forward (to the left in the figure) at the reflecting mirror 206 and passes through the quarter-wave plate 205 again. The light having undergone the process of polarization conversion by passing through the quarter-wave plate 205 twice is then transmitted through the PBS 204 and is projected onto an external screen (not shown) through an aperture 213a and an opening 251 at the casing 200.

In order to display a bright, clear image on the screen, the LED 201 used as the light source must emit bright light and a large electrical current (e.g., 400 mA) must be supplied to the LED 201 to enable bright light output. As a result, a great deal of heat is generated at the LED 201, which causes the concern of possible adverse effects from heat.

Figure 8:
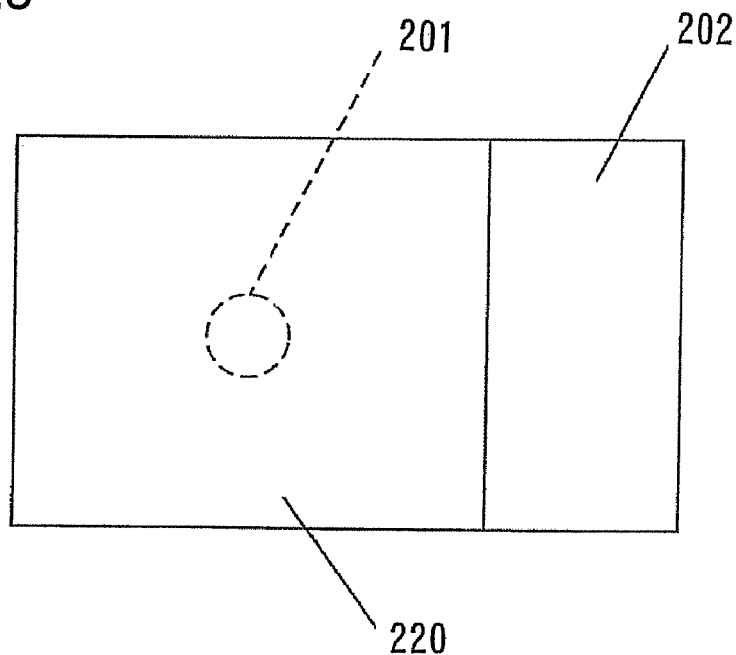
FIG. 8 is a sectional view taken along line II-II in FIG. 7.

Accordingly, a metal block (heat transfer block) 220 is disposed under the LED substrate 202 so as to minimize the extent to which the temperature at the LED 201 rises via the metal block 220. The metal block 220 is formed by processing a material with high heat conductivity such as aluminum or copper into the shape of a substantially quadrangular prism. Its upper surface is placed in surface contact with the lower surface (exposed metal portion) of the LED substrate 202. As FIG. 8 indicates, the position at which the metal block 220 is disposed (directly under the LED 201) corresponds to the mounting position at which the LED 201 is mounted. The metal block 220 may be mounted at the LED substrate 202 by using a screwing means, or the metal block 220 may be fitted at a fitting portion of the substrate 202.

The structure described above allows the heat generated at the LED 201 to be sequentially released through the LED substrate 202 constituted of metal and the metal block 220, and, as a result, the increase in the temperature at the LED 201 can be minimized. In particular, since a side surface and the lower surface of the metal block 220 achieve surface contact with the inner surface of the casing 200, as shown in FIG. 7, the heat at the metal block 220 can be released to the outside with a high degree of efficiency through the casing 200 so as to minimize the increase in the temperature at the LED 201 even more effectively in the third embodiment.

When a heat generating element is set in contact with a thermally conductive member (heat transfer member) so as to release the heat at the heat generating element by transferring it to the heat transfer member, the heat is primarily transferred at the heat transfer member along a direction perpendicular to the surface that is in contact with the heat generating element and only a small quantity of heat is transferred along the direction extending along the contact surface under normal circumstances. Namely, in the example described above, the heat generated at the LED 201 is primarily transferred downward along the vertical direction at the heat transfer member (the LED substrate 202 and the metal block 220 in this example) and no significant quantity of heat is transferred along the lateral direction. This means that the heat from the LED 201 can be released more efficiently by setting the metal block 220 so that its longer side runs along the vertical direction rather than by setting the metal block 220 so that its longer side sits horizontally. Accordingly, the lateral measurement of the metal block 220 achieved in the third embodiment is set to the smallest possible value while the height of the metal block 220 is maximized.

While it is more desirable to set the height of the metal block 220 to the greatest possible value, a significant advantage can be achieved as long as the following relationship is satisfied.

Figure 9:
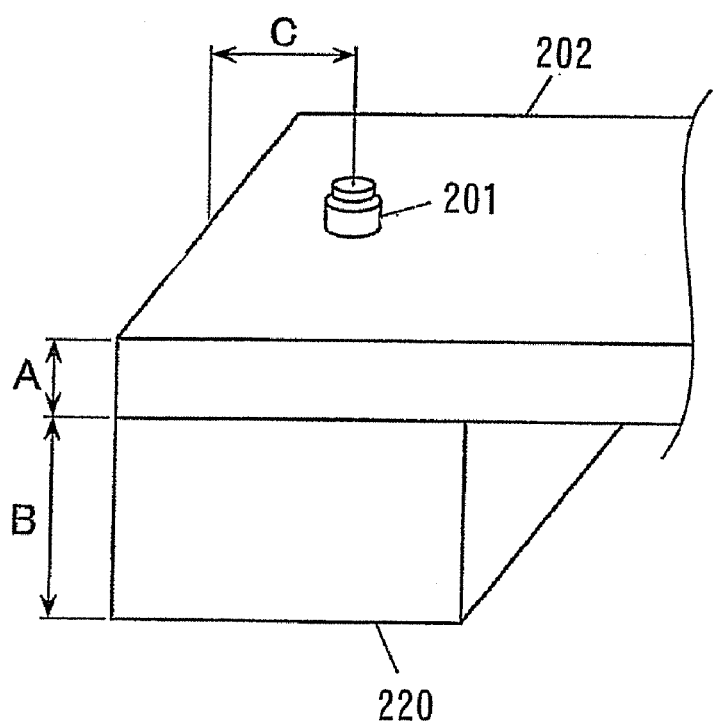
FIG. 9 illustrates the height that should be achieved by a metal block.

With A, B and C in FIG. 9 respectively representing the thickness of the LED substrate 202, the height of the metal block 220 and the distance from the LED 201, i.e., the heat generating element, to an end surface of the metal block 220

(the distance over which the heat is transferred along the horizontal direction), the height B should be determined so as to satisfy the relationship express as in (1) below.

$$A+B>C \qquad (1)$$

Figure 10:
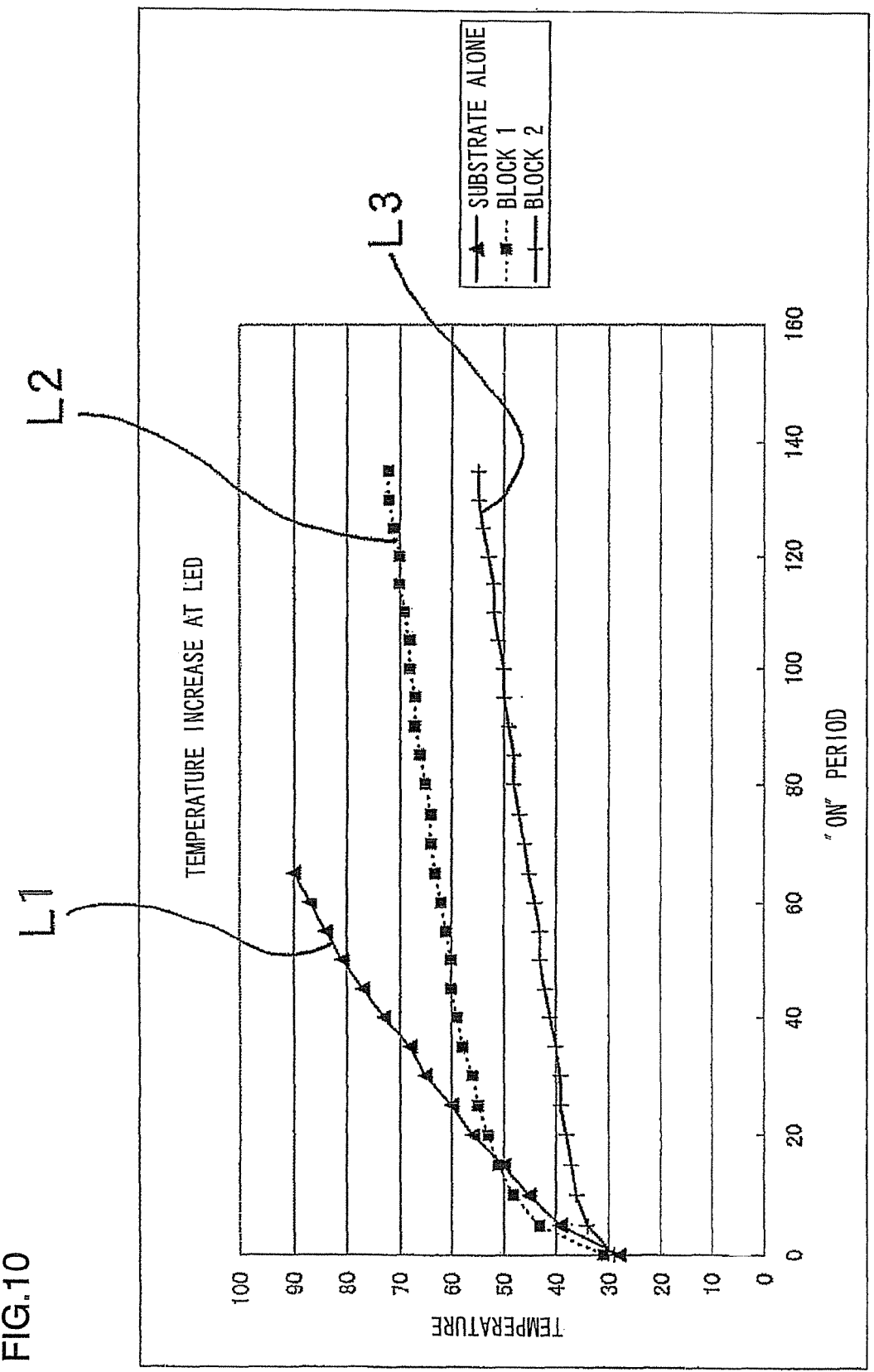
FIG. 10 shows three patterns of temperature change relative to the length of time over which an LED remains on, representing an example of the results of tests conducted by the inventors of the present invention.

FIG. 10 presents an example of the results of tests conducted by the inventors of the present invention.

In FIG. 10, the length of time over which the LED 201 remained on is indicated along the horizontal axis and the temperature at the LED 201 is indicated along the vertical axis. L1 represents a case in which only the metal LED substrate 202 was used and no metal block 220 was included in the structure, whereas L2 and L3 each represents a case in which the metal LED substrate 202 and the metal block 220 satisfying the relationship expressed in (1) were used in combination. While the shapes of the metal blocks 220 used in the cases corresponding to L2 and L3 were similar, the metal block 220 in case L2 was constituted with an aluminum material in the A5000s and the metal block 220 in case L3 was formed by using an aluminum material in the A6000s.

As FIG. 10 indicates, the temperature at the LED 201 increased as the LED 201 became turned on in each of the cases described above. When no metal block 220 was used, as in case L1, the LED temperature reached a level close to 90° within approximately 60 seconds after the LED 201 was turned on. In contrast, when the metal block 220 constituted of an aluminum material in the A5000s was used, the temperature was kept down at approximately 72° even after two minutes or more elapsed, as indicated by L2. Furthermore, the temperature is kept down to approximately 55° even when two minutes or more elapsed in the structure that included the metal block constituted with an aluminum material in the A6000s with a higher level of thermal conductivity, as indicated by L3. In addition, although not indicated in the test results, an aluminum material in the A1000s, too, achieves a high level of thermal conductivity and, accordingly, favorable results are likely to be achieved by using a metal block constituted with an aluminum material in the A1000s, as well.

As described above, the vertically elongated metal block 220 is included to minimize the extent to which the temperature rises at the LED 201, and thus, any damage due to the heat from the LED 201 is prevented even though a large current is supplied to the LED 201 in the third embodiment. For this reason, an expensive and large scale heat releasing (cooling) device such as a cooling fan or a Peltier element, is not necessary. In addition, since the metal block 220 does not range significantly along the horizontal direction, the entire projector module PM is allowed to assume a vertically elongated shape and the metal block 220 does not project out further along the horizontal direction beyond the image forming unit or the projection unit. This, in turn, increases the degree of freedom with which other members are disposed inside the casing 200 together with the projector module PM.

In addition, the heat transfer unit (the metal block 220 and the LED substrate 202), the light source unit (the LED 201), the image forming unit (the liquid crystal panel 203) and the projection unit (the PBS 204, the mirror 206 and the like) stacked along a single direction constitutes a single unit and the optical axis OX of the light projected by the projection unit is set along a direction perpendicular to the stacking direction. As a result, with the individual members disposed as shown in FIG. 7, the optical axis OX of the projection light can be greatly distanced from the lower surface of the casing 200, i.e., from the installation surface. If the projection light axis extends close to the installation surface, an image cannot be projected onto the external screen with ease and, accordingly, measures such as projecting the image upwards along a diagonal direction will need to be taken.

FIGS. 11 through 18 show examples of variations of the third embodiment. In each of these embodiments, the height of the metal block satisfies the relationship expressed in (1) above.

Figure 11:
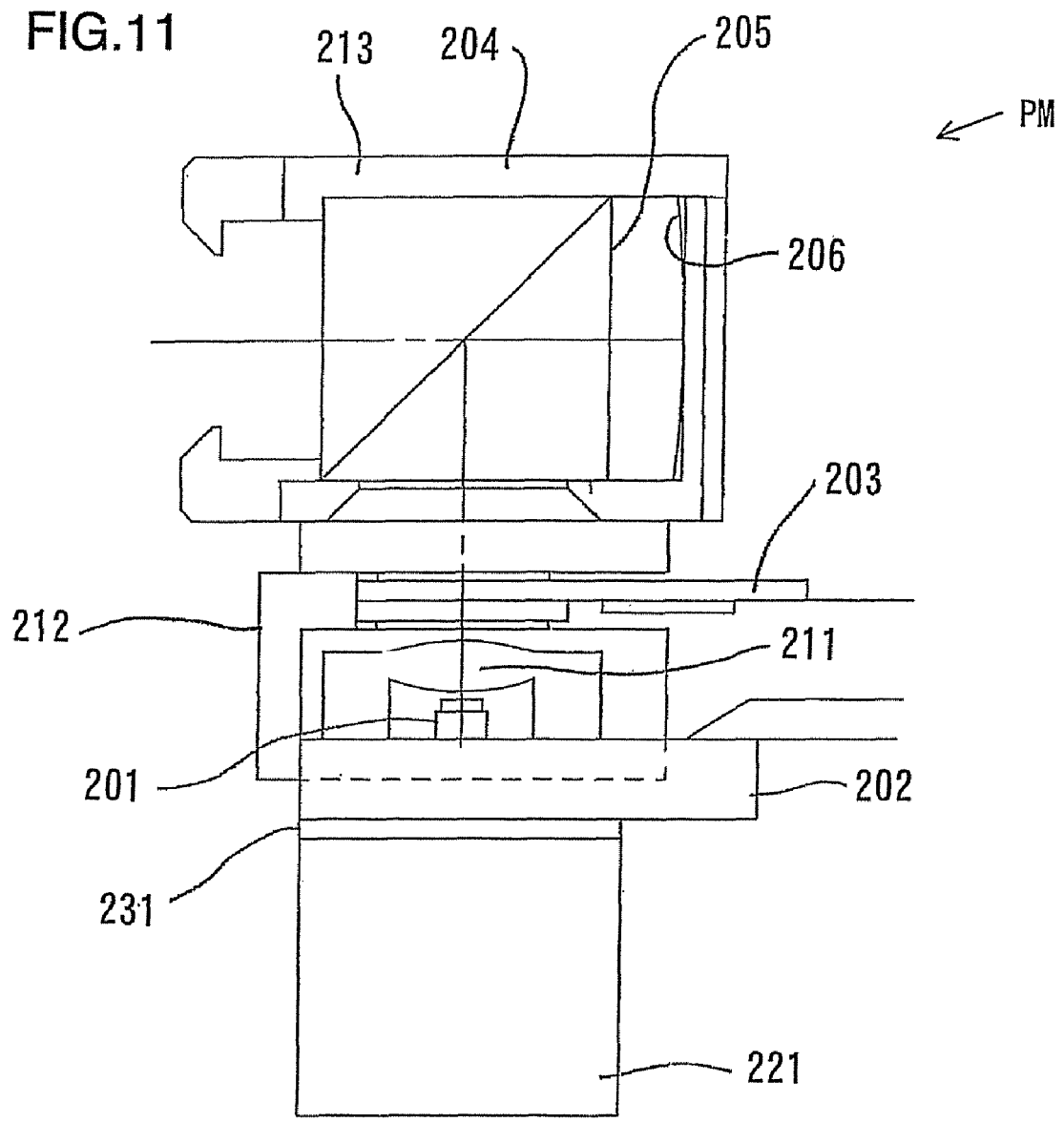
FIG. 11 presents an example in which the metal block is fixed onto an LED substrate via a thermally conductive bonding member.

FIG. 11 shows a projector module PM having a metal block 221 locked to the LED substrate 202 via a thermally conductive bonding member 231. This structure facilitates the assembly process, and even if there are surface irregularities at the contact surfaces of the metal block 221 and the substrate 202, such irregularities can be absorbed and a high level of contact adhesion can be assured so as to maximize the thermal conduction efficiency. A thermally conductive elastic sheet may be disposed between the surfaces of the metal block and the substrate as well. While the height of the metal block 221 is smaller than that in the example presented in FIG. 7 and the extent of the temperature increase at the LED is not inhibited as effectively for this reason, a more compact structure is achieved.

Figure 12:
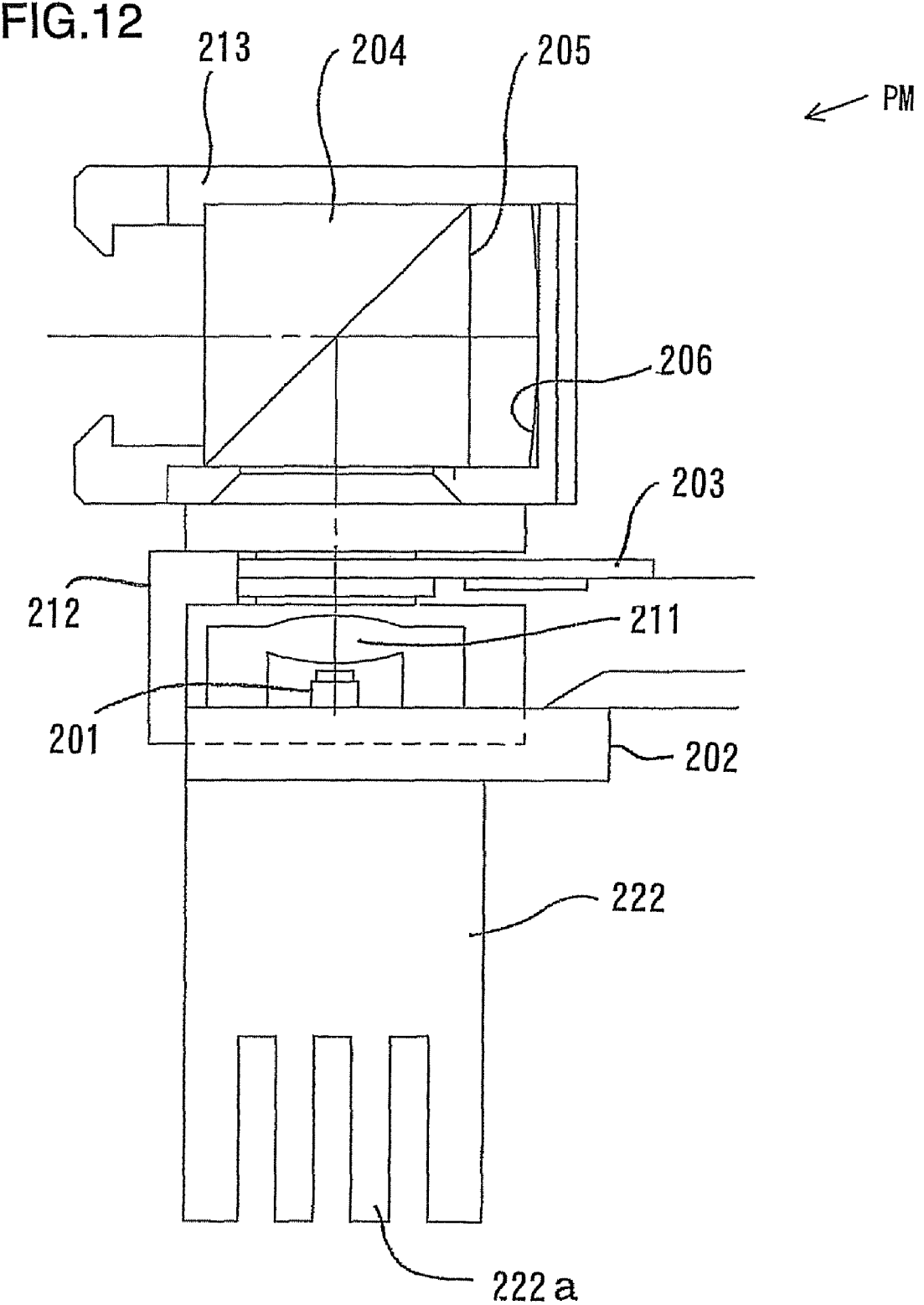
FIG. 12 presents an example in which fins are formed over the lower portion of the metal block.
Figure 13:
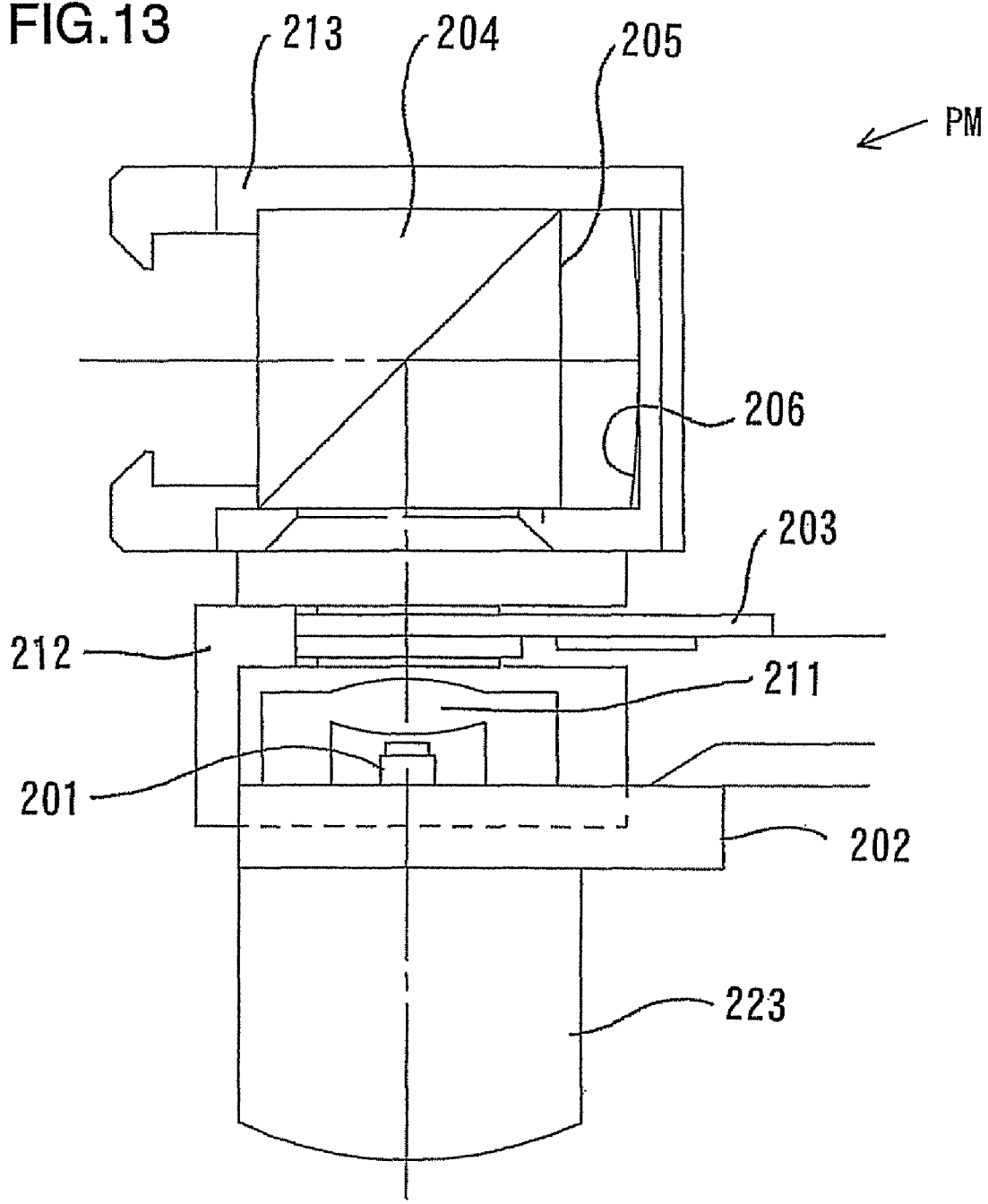
FIG. 13 presents an example in which the lower surface of the metal block is formed in a circular arc-shape.

FIGS. 12 and 13 each show a projector module PM having a metal block assuming a different shape. The projector module PM in FIG. 12 includes fins 222*a* formed at the bottom of a metal block 222 and thus, the efficiency with which the heat is released into the air is improved by increasing the heat releasing area. This structure will be particularly effective in a situation in which convection of air readily occurs near the fins 222*a*. In the projector module PM in FIG. 13, the lower end surface of a metal block 223 assumes a spherical shape so as to increase the heat releasing area and improve the heat releasing efficiency.

Figure 14:
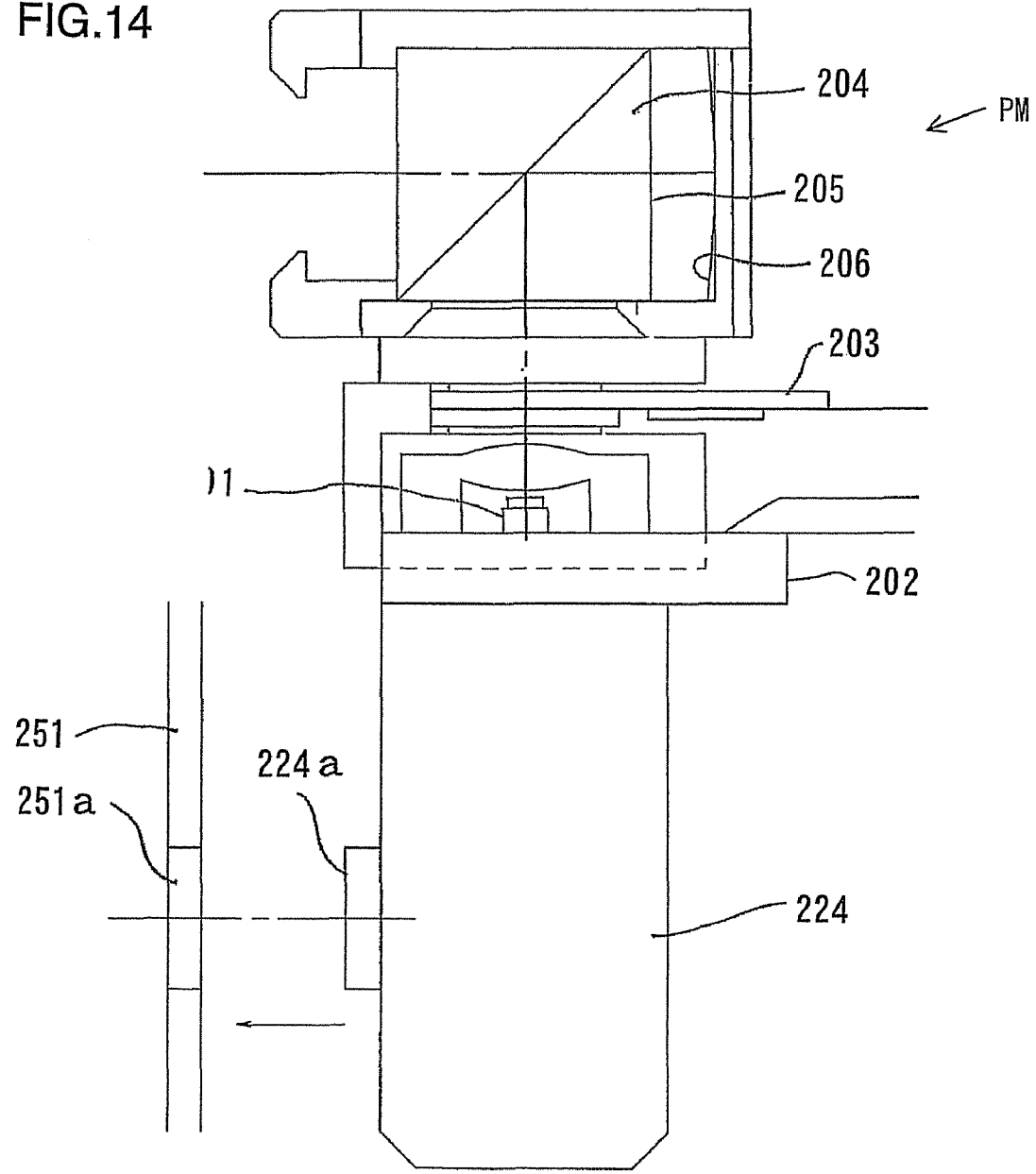
FIG. 14 presents an example in which a positioning boss is disposed at the side surface of the metal block.

FIG. 14 presents an example of a projector module PM having a positioning boss 224*a* disposed at a side surface of a metal block 224. By inserting the boss 224*a* at a positioning hole 251*a* formed at a casing 251 of the electronic apparatus, the position of the projector module relative to the casing 251 can be determined so as to facilitate the process of mounting the projector module PM at the casing 251.

Figure 15:
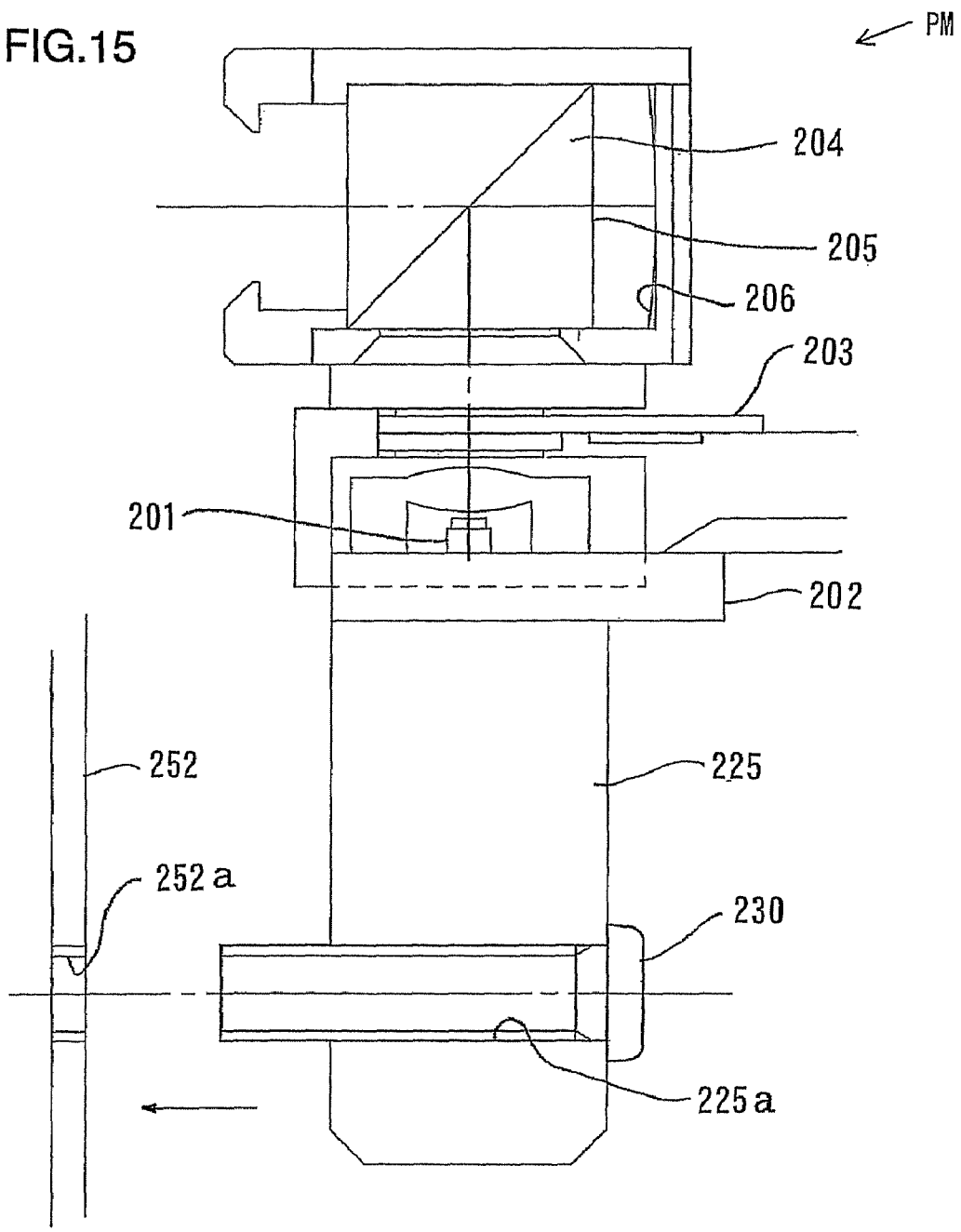
FIG. 15 presents an example in which a screw through hole is formed at the metal block.
Figure 16:
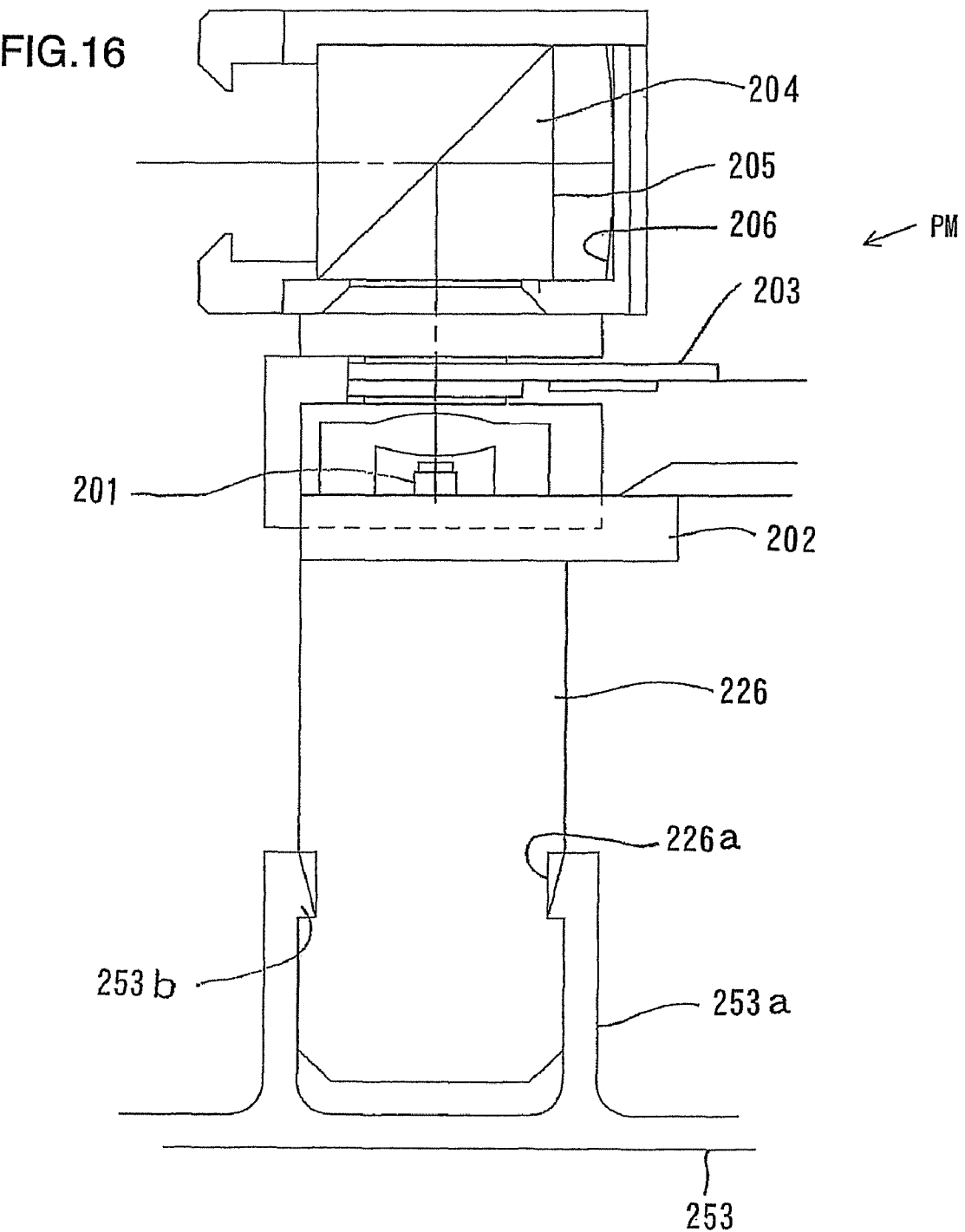
FIG. 16 presents an example in which a fitting portion is formed at the metal block.
Figure 17:
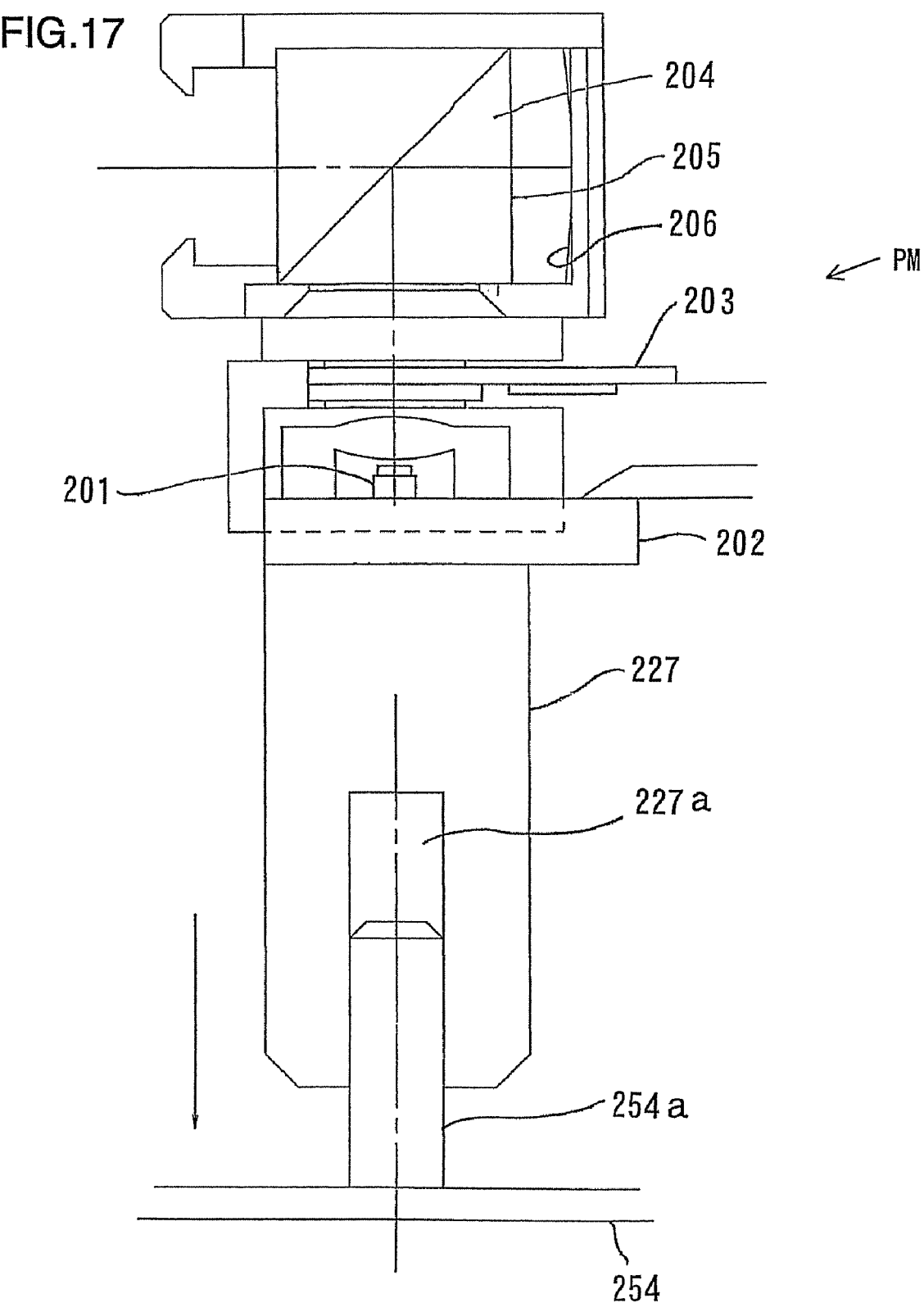
FIG. 17 presents an example in which a fitting hole is formed at the metal block.

FIGS. 15 through 17 each present an example of a projector module PM in which the metal block includes a mounting portion to be used when mounting the projector module at a casing. In the projector module PM in FIG. 15, a screw through hole 225*a* is formed at a metal block 225, and the projector module PM is mounted by inserting a screw 230 into the hole 225*a* and then threading the screw into a threaded hole 252*a* at a casing 252.

The projector module PM in FIG. 16 is locked by fitting the bottom portion of a metal block 226 in a fitting portion 253*a* at a casing 253 and interlocking a clasp 253*b* of the fitting portion 253*a* in a groove 226*a* at the metal block 226. The fitting portion 253*a* at the casing 253 is constituted with an elastic material (e.g., plastic) and the clasp 253*b* is interlocked at the groove 226*a* as the fitting portion undergoes elastic deformation. This structure greatly facilitates the process of mounting the projector module PM. The projector module PM in FIG. 17 is locked by inserting a boss 254*a* at a casing 254 into a hole 227*a* formed at the bottom of a metal block 227 so as to range along longitudinal direction.

By adopting any of the structures shown in FIGS. 14 through 17, the metal block, which functions primarily as a heat transfer block, is allowed to provide an additional function such as that of a positioning member or a mounting member. As a result, a reduction in the number of required parts is achieved.

Figure 18:
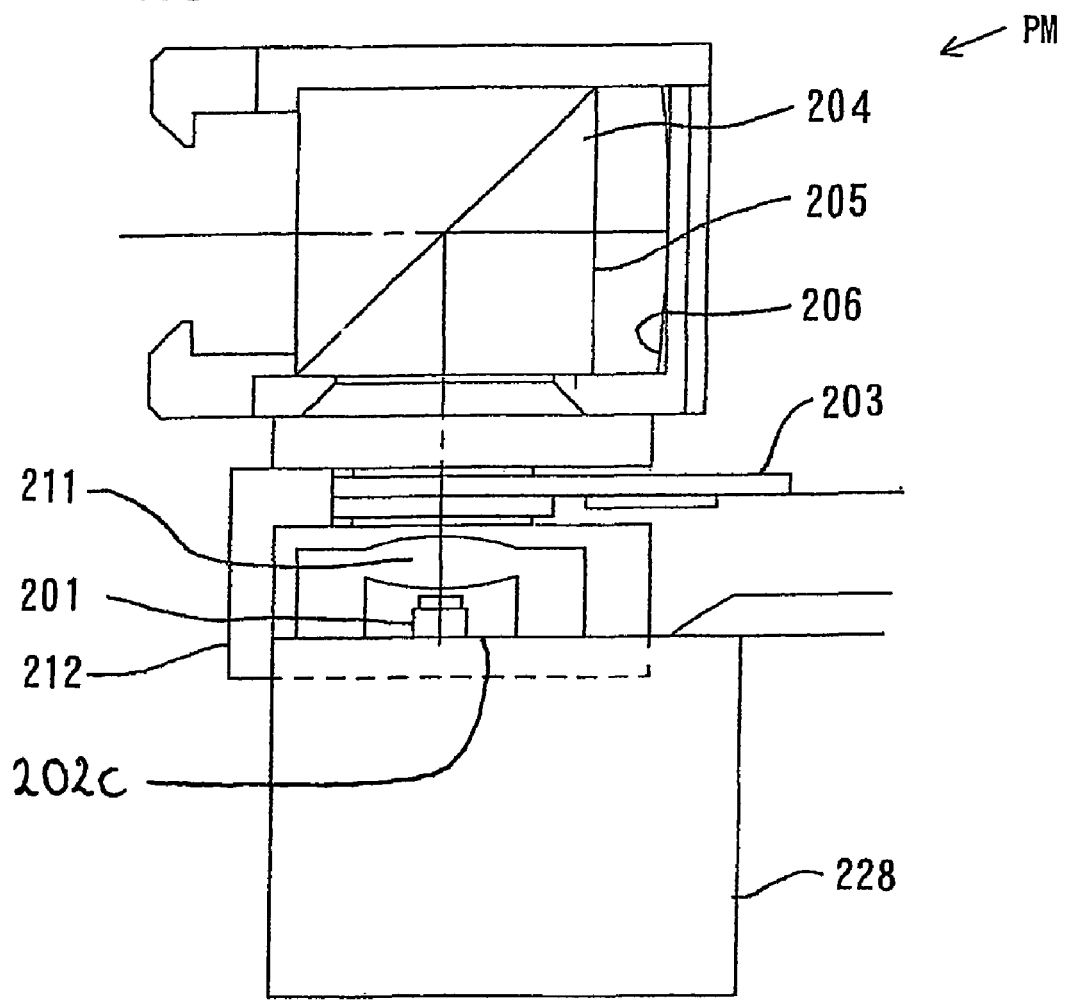
FIG. 18 presents an example in which the LED is directly mounted at the metal block.

FIG. 18 shows an embodiment achieved by directly mounting an LED at a metal block. At the projector module PM in FIG. 18, a conductive circuit is formed via an insulating layer over the upper surface of a metal block 228 constituted of, for instance, aluminum and the LED 201 is directly mounted at the conductive circuit. The height of the metal block 228 is set greater than the lateral distance between the mounting position at which the LED 201 is mounted and an end of the mounting surface. In addition, the lens 211 and the frame 212, too, are directly fixed onto the metal block 228. This structure allows the heat generated at the LED 201 to be directly transferred to the metal block 228, achieving a higher level of thermal conduction efficiency than the third embodiment and the other variations explained earlier and thus, the extent of the temperature increase at the LED 201 can be more effectively inhibited. In addition, since no LED substrate is included, the number of required parts is reduced, which assures ease of assembly and low production costs.

When the LED 201 is directly mounted at the metal block 228 as shown in FIG. 18, too, a positioning portion or a mounting portion used to position the projector module relative to an electronic apparatus or to mount the projector module at the electronic apparatus, such as any of those shown in FIGS. 14 through 17, may be induced in the metal block 228.

It is to be noted that the metal block may assume a shape other than those in the examples presented in FIGS. 7 through 18, and it may assume, for instance, a cylindrical shape. In addition, the image forming member does not need to be a transmission-type liquid crystal panel and it may instead be a reflective liquid crystal or another type of image forming member. Furthermore, while an explanation is given above on an example in which the present invention is adopted in projector modules, the present invention may also be adopted in other types of illuminating modules that use LEDs as light sources, such as an LED flash module in a camera and an AF auxiliary illuminating module.

In the third embodiment and its variations explained above, the LED is mounted at the mounting surface 202c of the metal substrate, the heat transfer block constituted of metal is set in surface contact with the surface of the metal substrate located on the side opposite from the mounting surface 202c at a position corresponding to the mounting position at which the LED is mounted, and the sum of the thickness of the metal substrate and the length of the heat transfer block extending along the direction perpendicular to the mounting surface is set greater than the lateral distance from the LED mounting position to an end of the mounting surface. As a result, the heat generated at the LED can be released from the metal substrate to the heat transfer block efficiently and the extent to which the temperature at the LED rises can be minimized without having to include a large-scale device.

In addition, by mounting the LED at the mounting surface of the metal heat transfer block and ensuring that the length of the heat transfer block along the direction perpendicular to the mounting surface is greater than the lateral distance from the LED mounting position to an end of the mounting surface, as shown in FIG. 18, advantages similar to those described above can be achieved.

Fourth Embodiment

Figure 19:
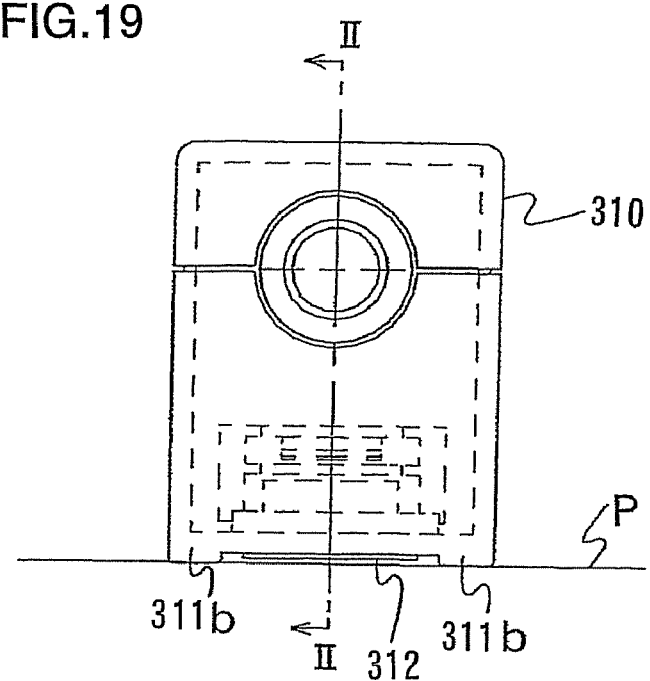
FIG. 19 is a front view of the projector achieved in a fourth embodiment.
Figure 20:
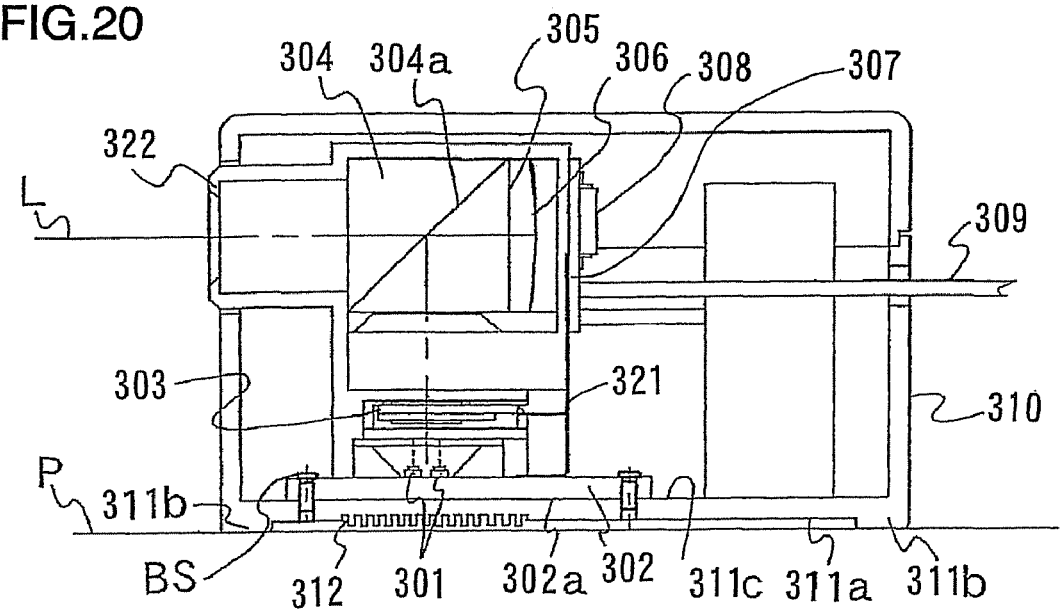
FIG. 20 is a sectional view taken along line II-II in FIG. 19.

An illuminating device achieved in the fourth embodiment of the present invention is now explained in reference to FIGS. 19 and 20. The illuminating device in the fourth embodiment is constituted as a liquid crystal projector.

FIG. 19 is a front view of the liquid crystal projector achieved in the fourth embodiment and FIG. 20 is a sectional view taken along line II-II. A casing 310 of the projector is constituted of a metal material achieving a high level of thermal conductivity, e.g., die-cast aluminum. Legs 311b are disposed at the four corners of a lower surface 311a of the casing 310 so as to form a gap between a surface P of a desk or the like on which the casing 310 may be placed and the casing lower surface 311a.

The following components are housed inside the casing 310.

LEDs 301 capable of emitting very bright light, which are used as a light source, are mounted at a metal LED substrate 302. The LED substrate 302 includes a conductive circuit formed at the upper surface of, for instance, an aluminum plate via a thermally conductive insulating layer, with the LEDs 301 mounted at the upper surface thereof and a metal portion exposed at a lower surface 302a thereof. The substrate 302 is disposed so that its lower surface 302a comes into complete contact (surface contact) with a bottom surface 311c of the casing 310 and is fixed onto the casing 310 with screws BS. Fins 312 are formed at a casing lower surface 311a so as to project out and recess under the substrate 302.

Above the LED substrate 302, a liquid crystal panel 303 constituting an image forming member is disposed and, above the liquid crystal panel 303, a polarizing beam splitter (PBS) 304 constituting a light path altering member is disposed. A PBS film 304a forms a 45° angle relative to an optical axis L of the LED light. Further rearward relative to the PBS 304, a quarter-wave plate 305 and a reflecting mirror 306 are disposed. The mirror 306 constitutes a projection optical system and its reflecting surface may be a spherical surface or a non-spherical surface.

At a control circuit substrate 307 disposed to the rear of the mirror 306, a control IC 308 is mounted and one end of an external cable (e.g., a USB cable) 309 is connected to the control circuit substrate 307. The control IC 308 is electrically connected with the LED substrate 302 and the liquid crystal panel 303 via a wiring member 321. Power and control signals are supplied from an external apparatus (not shown) via the cable 309 and the control IC 308 implements on/off control of the LEDs 301, drive control for the liquid crystal panel 303 and the like in response to signals input thereto.

As an image is formed at the liquid crystal panel 303 and the LEDs 301 is turned on, the light generated at the LEDs 301 is transmitted through the liquid crystal panel 303, reaches the PBS 304 and is reflected rearward (to the right in the figure) at the PBS film 304a. After passing through the quarter-wave plate 305, the reflected light is reflected forward (to the left in the figure) at the reflecting mirror 306 and passes through the quarter-wave plate 305 again. The light having undergone the process of polarization conversion by passing through the quarter-wave plate 305 twice is then transmitted through the PBS 304 and is projected to the outside through an aperture 322 located near the exit. The use of such an optical system makes it possible to provide the illuminating device as a compact unit that is still capable of minimizing the extent of chromatic aberration.

While the LEDs 301, to which a large current is supplied, generate a significant quantity of heat, the heat is transferred to the metal LED substrate 302 and is released to the outside via the metal casing 310. Since the substrate lower surface 302a is in complete contact (surface contact) with the bottom surface 311c of the casing 310, the heat from the LEDs 301 can be efficiently transferred to the casing 310. In addition, the casing 310 faces the external space over a large area and, for this reason, the heat at the casing can be released to the outside efficiently. In particular, the temperature at the casing lower surface 311a over the area directly under the LED substrate 302 reaches the highest level, but since the fins 312 are formed over this area, the heat releasing area is increased to achieve a high level of heat releasing efficiency. For this reason, even though a large current is supplied to the LEDs 301, the heat from the LEDs 301 does not cause damage. Moreover, no substantial increase in the number of required components is necessitated since no cooling fan, metal heat releasing member, Peltier element or the like needs to be added, unlike in the related art.

It is to be noted that since the gap created between the casing lower surface 311a and the surface P upon which the projector is installed is open on four sides, heat is not trapped in this space.

Disposing the LED 301 close to the lower surface of the casing 310, as described above, is advantageous especially for the following two reasons.

First, the heat from the LEDs 301 is primarily released through the casing lower surface 311a, i.e., the temperature rises to the highest level at the lower surface 311a in the casing 310. Since the lower surface 311a is the portion least likely to come into direct contact with the user, the user is almost completely spared any discomfort attributable to the heat from the LEDs 301. In addition, by disposing the LEDs 301 near the lower surface of the casing 310, the light from the LEDs can be irradiated upward and then can be bent along the horizontal direction for a projection. This structure achieves a highly efficient utilization of the available space and the optical axis L of the projection light can be set at a highest possible position, i.e., at a position distanced from the surface P upon which the projector is installed, without having to increase the bulk of the casing 310. It is to be noted that if the optical axis L is set to close to the surface P upon which the projector is installed, the image cannot easily be projected onto the external screen with ease and, for this reason, measures such as projecting the image upward along a diagonal direction need to be taken.

It is to be noted that an elastic sheet achieving a high level of thermal conductivity may be inserted between the lower surface 302a of the LED substrate 302 and the casing bottom surface 311c. The elastic sheet present between the lower surface 302a and the casing bottom surface 311c will absorb any irregularities that may be present at the surfaces 302a and 311c to assure good contact and maximum efficiency in thermal conduction.

Fifth Embodiment

Figure 21:
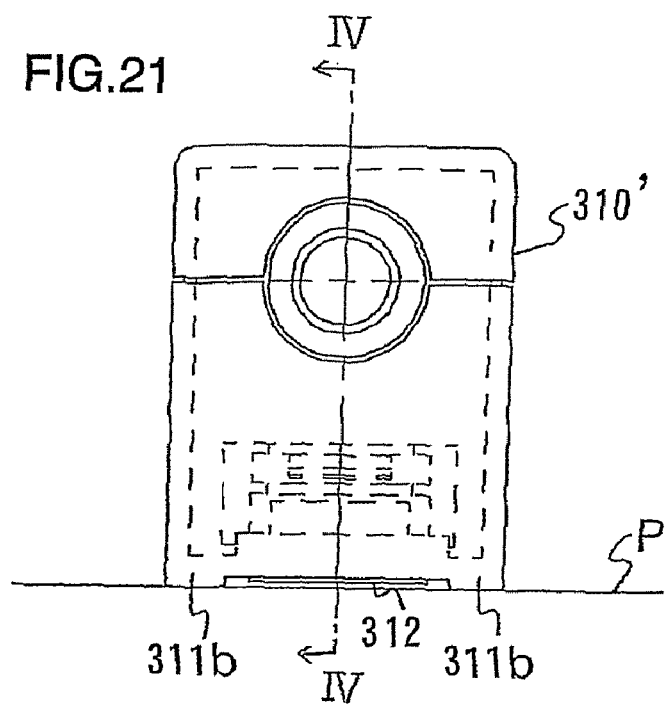
FIG. 21 is a front view of the projector achieved in a fifth embodiment.
Figure 22:
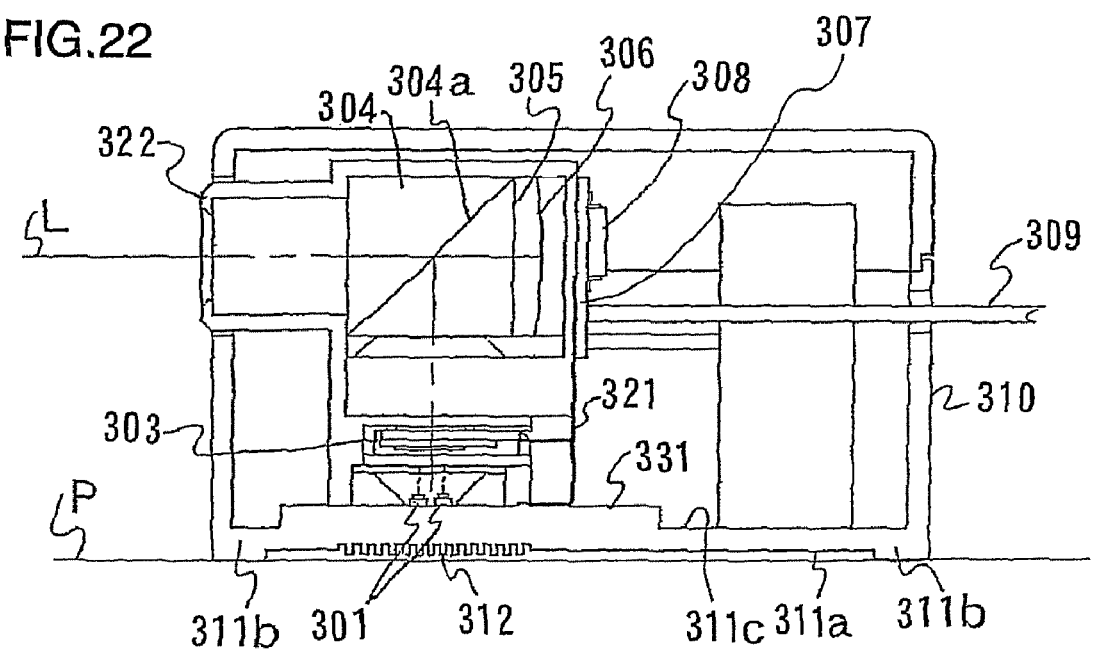
FIG. 22 is a sectional view taken along line IV-IV in FIG. 21.

FIG. 21 shows an illuminating device achieved in the fifth embodiment and FIG. 22 is a sectional view taken along line IV-IV in FIG. 21. FIGS. 21 and 22 show an example in which the LEDs 301 is directly mounted at the lower surface of a metal casing 310'. In FIGS. 21 and 22, the same reference numerals are assigned to components having functions similar to those in FIGS. 19 and 20.

A conductive circuit is formed via an insulating layer at the upper surface of a mounting portion 331 formed as an integrated part of the casing bottom surface 311c, and the LEDs 301 can be directly mounted at the conductive circuit. The fins 312 similar to those described earlier are formed at the casing lower surface 311a at a position under the mounting portion 331. This structure allows the heat from the LEDs 301 to be directly transferred to the casing 310', achieving superior thermal conduction efficiency, i.e., superior heat releasing efficiency, over the previous embodiments, and since no LED substrate is included, a reduction in the number of required parts is achieved.

It is to be noted that there are no specific restrictions to be imposed with regard to the position at which the LEDs should be disposed and that the LED substrate 302 may be mounted or the mounting portion 331 may be formed at a location other than the bottom surface. In addition, while an explanation is given above on an example in which the entire casing is constituted of metal, part of the casing may be constituted of plastic or the like as long as the area where the LED substrate 302 is mounted or the mounting portion 331 is formed, at least, is constituted of metal, instead. Furthermore, the image forming member does not need to be a transmission-type liquid crystal panel and it may instead be a reflective liquid crystal or another type of image forming member. While an explanation is given above on an example in which the present invention is adopted in projectors, the present invention may also be adopted in other types of illuminating devices that use LEDs as light sources, such as a camera having an LED flash and a camera that uses an LED as a light source for AF auxiliary light.

In the fourth and fifth embodiments described above, at least part of the casing is constituted of metal and the LEDs are mounted at a metal substrate that is locked onto the metal portion of the casing, or the LEDs are directly mounted at the inner surface of the metal portion of the casing. Thus, the heat generated from the LEDs are efficiently transferred to the casing and the heat can then be released to the outside through the casing. These highly efficient heat releasing structures are realized without having to provide a special cooling fan, Peltier element or the like.

Sixth Embodiment

The following is an explanation of an illuminating device achieved in the sixth embodiment of the present invention. The illuminating device in the embodiment is constituted as a projector.

Figure 23:
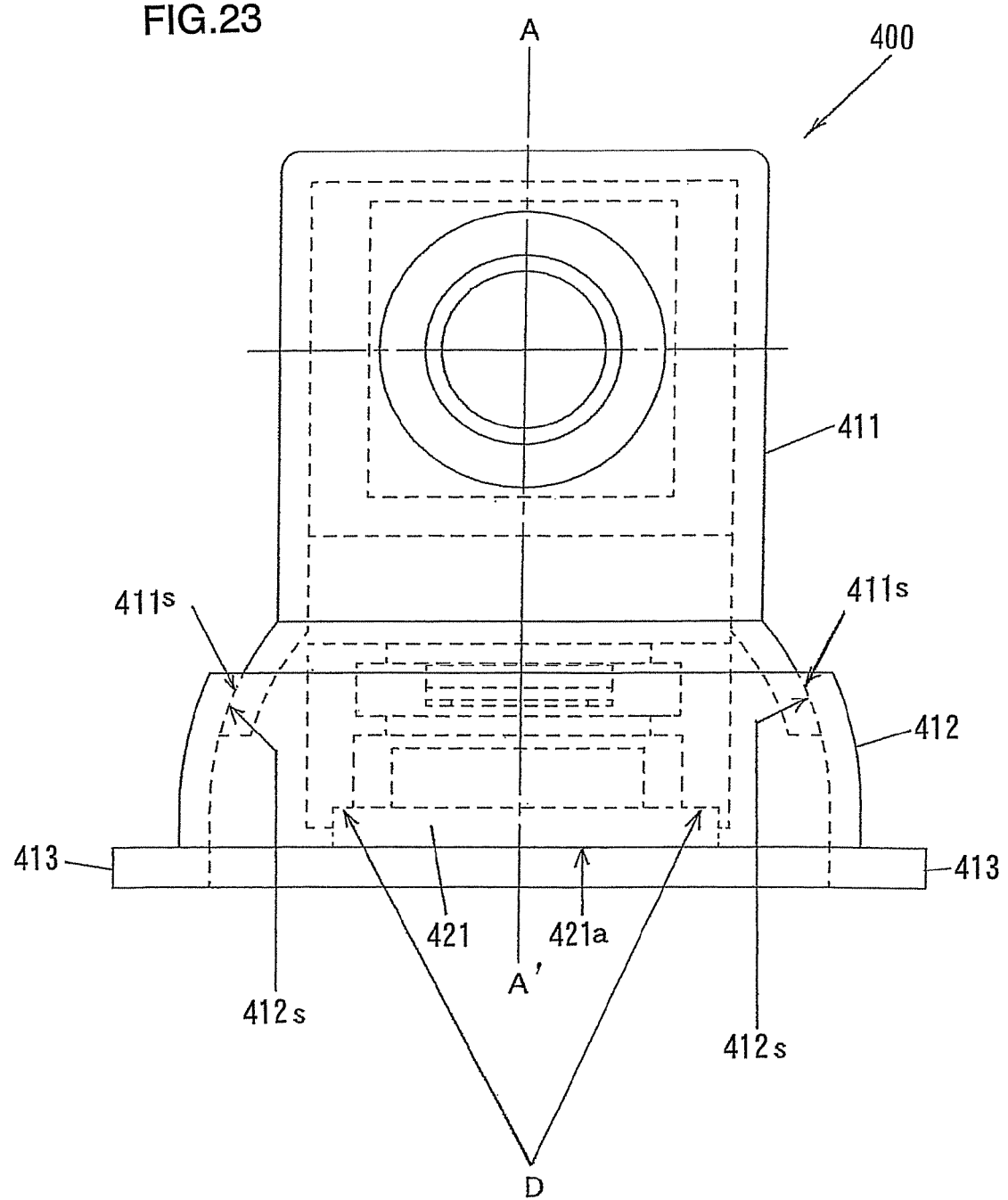
FIG. 23 is a front view of a liquid crystal projector achieved in a sixth embodiment of the present invention.
Figure 24:
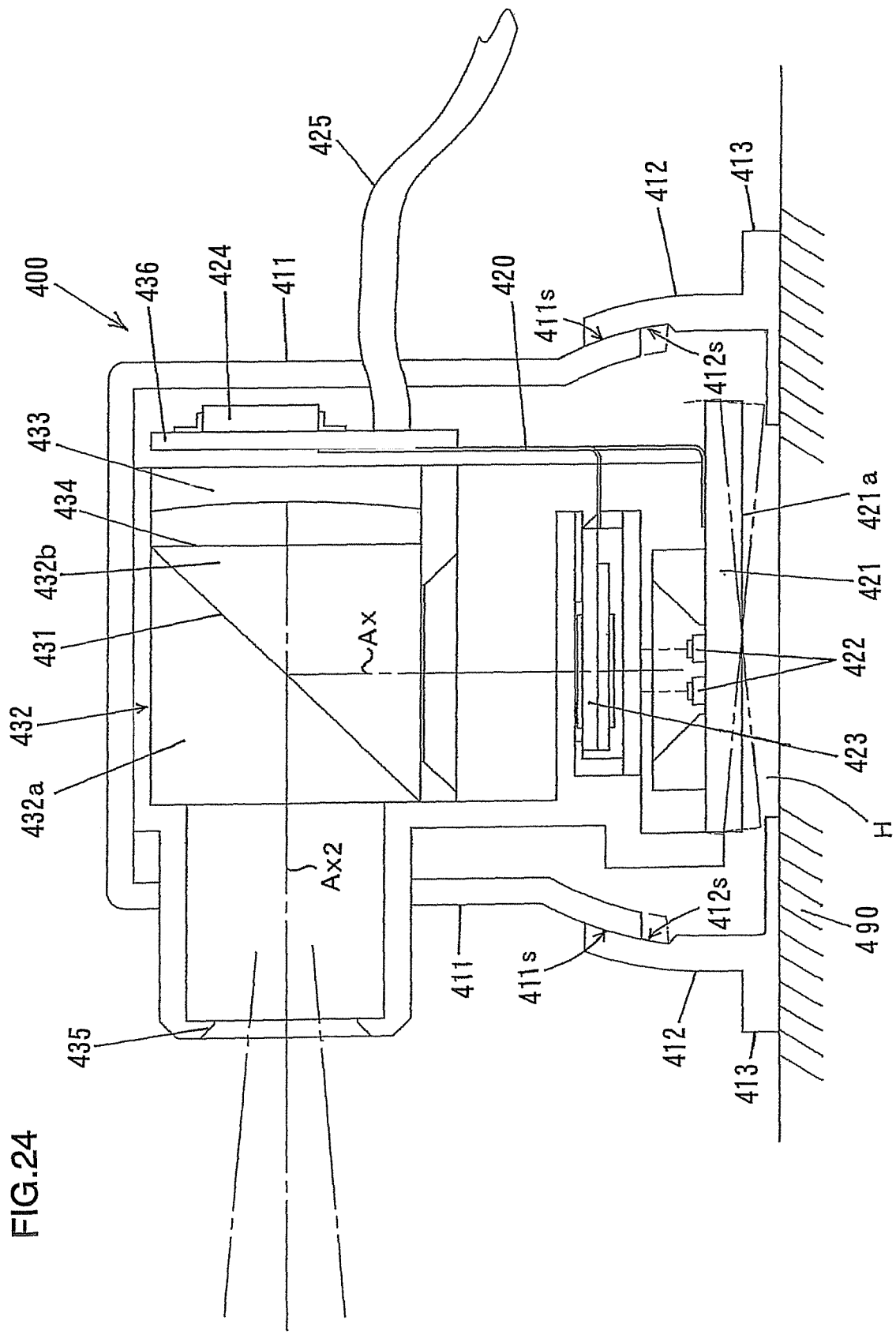
FIG. 24 is a sectional view of FIG. 23.

FIG. 23 is a front view of the liquid crystal projector achieved in the sixth embodiment and FIG. 24 is a sectional view of the liquid crystal projector taken along line A-A'. A projector 400 includes a first casing 411 in which an optical block is housed and a second casing 412 which is used as a seat for the first casing 411. The second casing 412 includes an optical system bearing portion 412s assuming the shape of part of a spherical surface, whereas the first casing 411 includes a seat contact portion 411s assuming the shape of part of a spherical surface. The optical system bearing portion 412s and the seat contact portion 411s are formed so as to achieve surface contact while they are allowed to slide against each other freely. This structure, which is similar to that of a ball joint, allows the orientation of the first casing 411 disposed on the second casing 412 to be adjusted freely. Both the first casing 411 and the second casing 412 are formed by using a material with low thermal conductivity such as plastic.

The structure of the optical block housed inside the first casing 411 is now explained. LEDs 422 capable of emitting light with a high level of brightness, which are used as the light source, are mounted on a metal substrate 421. The metal substrate 421 (mounting substrate), which may be, for instance, an aluminum substrate, includes a pattern formed on a thermally conductive insulating layer present at a component mounting surface or upper surface (the upper side in FIG. 24) and the LEDs 422 are mounted on the pattern. The metal substrate 421 is attached so that part of the component mounting surface comes in contact with a substrate bearing portion D (see FIG. 23) of the first casing 411, with a metal portion exposed at a lower surface 421a of the metal substrate 421.

The LEDs 422 illuminate a transmission-type liquid crystal panel 423 with a brightness corresponding to an electrical current supplied via a harness 420. The liquid crystal panel 423 is driven by a drive signal provided via the harness 420, in response to which an image or the like is reproduced. More specifically, a voltage corresponding to the density of each pixel in the image is applied to the liquid crystal layer, and the arrangement of the liquid crystal molecules in the liquid crystal layer to which the voltage has been applied changes, causing the transmittance of the light at the liquid crystal layer to change in units of individual pixels. At the liquid crystal panel 423 having undergone the change in the transmittance as described above, the light from the LEDs 422 is modulated and an optical image is generated. The light flux having been transmitted through the liquid crystal panel 423 advances upward in FIG. 24 and enters a prism block 432. It is to be noted that the liquid crystal panel 423 may be either a color display or a monochrome display.

The prism block 432 is constituted with a polarizing beam splitter (a light path altering member, hereafter referred to as a PBS) having two triangular prisms 432a and 432b sandwiching a polarizing beam splitting plane 431 which forms a 45° angle relative to the optical axis Ax of the light from the LEDs. At the exit surface on the right side of the PBS 432, a reflecting mirror 433 is disposed via a quarter-wave plate 434. The reflecting mirror 433 having a reflective surface formed to achieve a predetermined curved contour (either a spherical surface or a non-spherical surface) constitutes a projection optical system of the projector 400.

To the right of the reflecting mirror 433, a control circuit substrate 436 is disposed. A drive IC 424 is mounted at the control circuit substrate 436, and power and control signals are provided to the control circuit substrate 436 from an external apparatus (not shown) via an external cable (e.g., a USB cable) 425. The drive IC 424 outputs signals to be used to implement on/off control of the LEDs 422 and drive the liquid crystal panel 423 to the LEDs 422 and the liquid crystal panel 423 respectively via the harness 420 in response to the control signals.

The S polarized light component of the light flux having been transmitted through the liquid crystal panel 423 and then having entered the PBS 432 is reflected at the polarizing beam splitting plane 431 and advances to the right. The reflected light flux having advanced to the right exits the PBS 432, and is reflected at the reflecting mirror 433 via the quarter-wave plate 434. The reflected light flux then reenters the PBS 432 via the quarter-wave plate 434. The light flux having reentered the PBS 432 will have undergone the process of polarization conversion and become a P polarized light component while it has passed through the quarter-wave plate 434 twice. Thus, it is transmitted through the polarizing beam splitting plane 431 at the PBS 432 and advances to the left.

The transmitted light flux having advanced to the left exits the PBS 432 and further advances to the left before it is projected to the outside via an aperture 435. As a result, the optical image formed at the liquid crystal panel 423 is projected toward a screen (not shown) or the like. By using a projection optical system such as this, that does not include a refractive lens, the illuminating device is provided as a compact unit that is still capable of minimizing the extent of chromatic aberration.

Now, the structure of the second casing 412 (seat) is explained. The second casing 412 is set on a projector placement surface or installation surface 490 so as to allow an installation surface (the lower side in FIG. 24) of an installation portion 413 and the projector placement surface 490 to achieve surface contact with each other. The projector placement surface 490 may be the upper surface of a desk, a table or the like, a wall, a ceiling, a column or the like. An opening H is formed at the mounting surface of the mounting portion 413, so as to expose at least part of the lower surface 421a of the metal substrate 421 toward the placement surface 490. The lower surface 421a of the metal substrate 421 faces opposite the placement surface 490.

As the projector 400 is placed on the placement surface 490, a gap is formed between the lower surface 421a of the metal substrate 421 and the placement surface 490 so as to ensure that a layer of air is present between them. In addition, the installation portion 413 also acts as a guard member, as explained below, when the orientation of the first casing 411 is adjusted on the second casing 412. When the orientation of the first casing 411 on the second casing 412 is altered, the angle formed by the metal substrate 421 fixed onto the first casing 411 and the installation surface of the installation portion 413 also changes. When this angle becomes large, a risk of the lower surface 421a of the metal substrate 421 coming into contact with the placement surface 490 arises. Accordingly, the lower surface 421a is made to first come into contact with the installation portion 413 rather than the placement surface 490 to prevent the lower surface 421a from contacting the placement surface 490.

As a large electrical current is supplied to the LEDs 422 in the projector 400, the LEDs 422 generate a significant quantity of heat. The heat thus generated is transferred to the metal substrate 421 and is released to the air layer through the lower surface 421a of the metal substrate 421. While the temperature at the metal substrate 421 rises to the highest level over the area directly under the LEDs 422, this area is located within the space enclosed by the second casing 412 and the placement surface 490 and thus, the user does not inadvertently touch the heated area. In addition, since the placement surface 490 is not directly exposed to the heat, the increase in temperature at the placement surface 490 is minimized.

The following operational effects can be achieved in the sixth embodiment explained above.

(1) As the projector 400 is placed on the placement surface 490, an air layer is formed between the metal substrate 421 at which the LEDs 422 are mounted and the placement surface 490. As a result, the heat can be released to the air layer reliably without directly exposing the placement surface 490 to the heat. Thus, a compact and power efficient projector 400 is provided without having to add a special metal heat releasing member such as a heat sink or fins, a fan or a Peltier element.

(2) The area of the metal substrate 421 where the temperature rises to the highest level, i.e., the area directly under the LEDs 422, is positioned within the space enclosed by the second casing 412 and the placement surface 490 so as to ensure that the user does not inadvertently touch the heated area and experience discomfort.

(3) A mechanism similar to that of a ball joint is adopted to allow the orientation of the first casing 411 disposed on the second casing 412 to be adjustable. As a result, even after the projector 400 is locked on the placement surface 490, the direction along which the light emitted from the LEDs 422 advances (the direction along which the light is projected by the projector 400) can be adjusted. In addition, since the installation portion 413 of the second casing 412 also acts as a guard member, the metal substrate 421 is not allowed to come into contact with the placement surface 490 while adjusting the orientation of the first casing 411.

(4) The central line (the optical axis Ax) of the light flux emitted from the LEDs 422 is set substantially perpendicular to the placement surface 490 and the light flux is bent at the PBS 432 for projection. Thus, a wide clearance is created between the optical axis Ax2 (see FIG. 24) of the light flux having been bent and the placement surface 490. Since this assures a sufficient height for the projection light axis, a partial eclipse of the projection light flux at the placement surface 490 is prevented.

The installation portion 413 of the second casing 412 may be constituted by using a magnetic material or it may be constituted as a suction disk so as to achieve contact through suction.

The opening H formed at the installation surface of the installation portion 413 allows the heat to be readily released to the air layer through the lower surface 421a of the metal substrate 421 and also the edge of the opening H acts as a guard member that prevents the lower surface 421a of the metal substrate 421 from contacting the placement surface 490. Alternatively, the opening H may be covered with a mesh member or the opening H may be formed as a slit.

Seventh Embodiment

Figure 25:
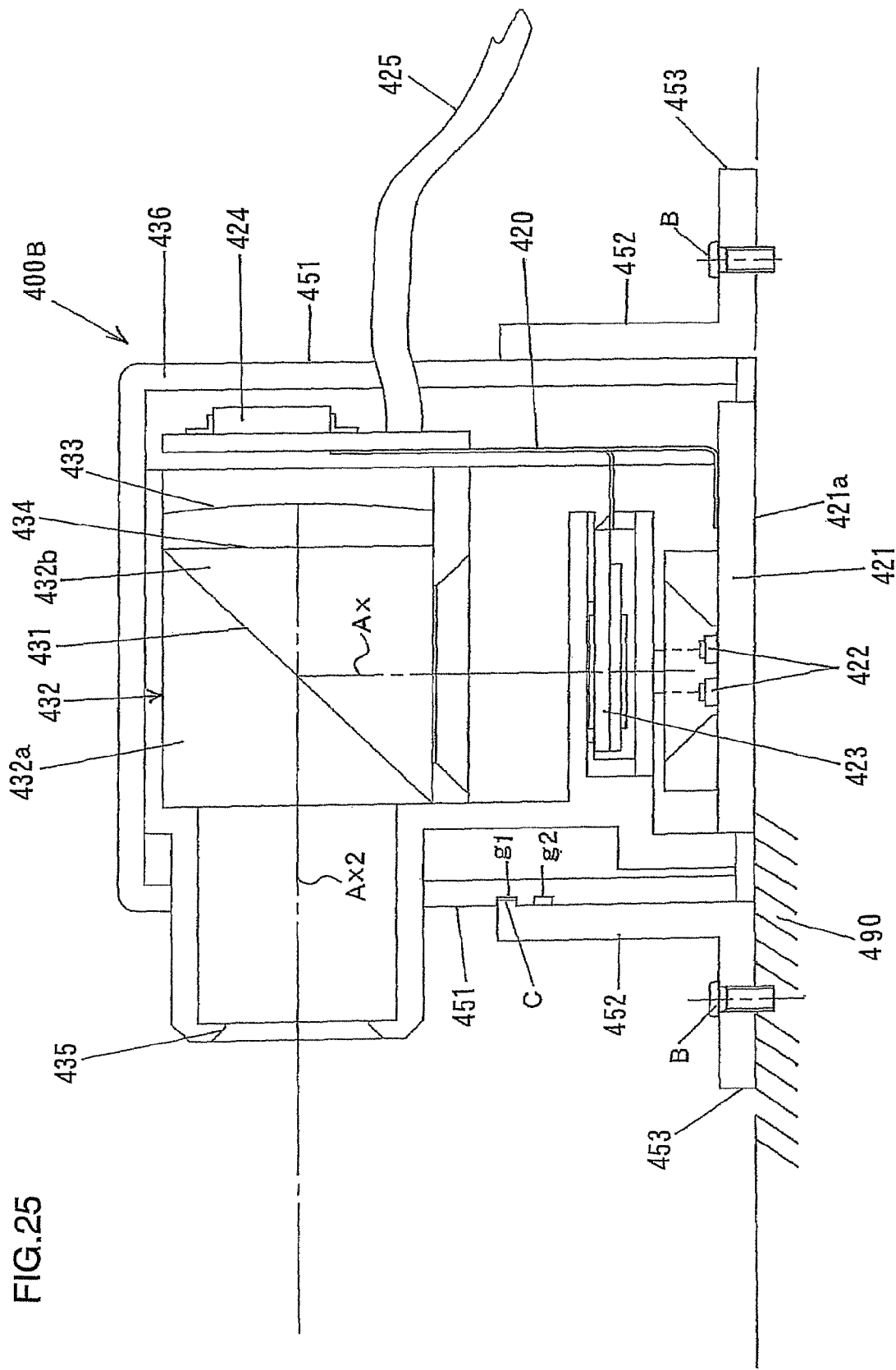
FIG. 25 is a sectional view of the liquid crystal projector achieved in a seventh embodiment.

FIG. 25 is a sectional view of a liquid crystal projector 400B achieved in the seventh embodiment of the present invention. In FIG. 25, the same reference numerals are assigned to members identical to those in FIG. 24 in reference to which the sixth embodiment has been explained to preclude the necessity for a repeated explanation thereof. The projector 400B includes a first casing 451 in which an optical block is housed and a second casing 452 used as a seat for the first casing 451.

The second casing 452 (seat) is set on the placement surface 490 so as to allow an installation portion 453 and the projector placement surface 490 to achieve surface contact with each other. Threaded holes are formed at the installation portion 453 and the second casing 452 is locked onto the placement surface 490 with screws B.

The first casing 451 (optical block) is structured so as to be allowed to slide freely along the inner surface of the second casing 452 in the direction extending along the optical axis Ax in FIG. 25, i.e., along the upward/downward direction. As the first casing 451 (optical block) is made to slide to the lowermost position, the lower surface 421a of the metal substrate 421 achieves surface contact with the placement surface 490. At this time, a projecting portion C at the inner surface of the second casing 452 clicks into and becomes interlocked with a groove portion g1 formed at the outer surface of the first casing 451 and thus, the first casing 451 becomes held by the second casing 452. By installing this projector 400B on the placement surface 490 made of metal, the heat can be directly released to the placement surface 490 from the metal substrate 421.

Figure 26:
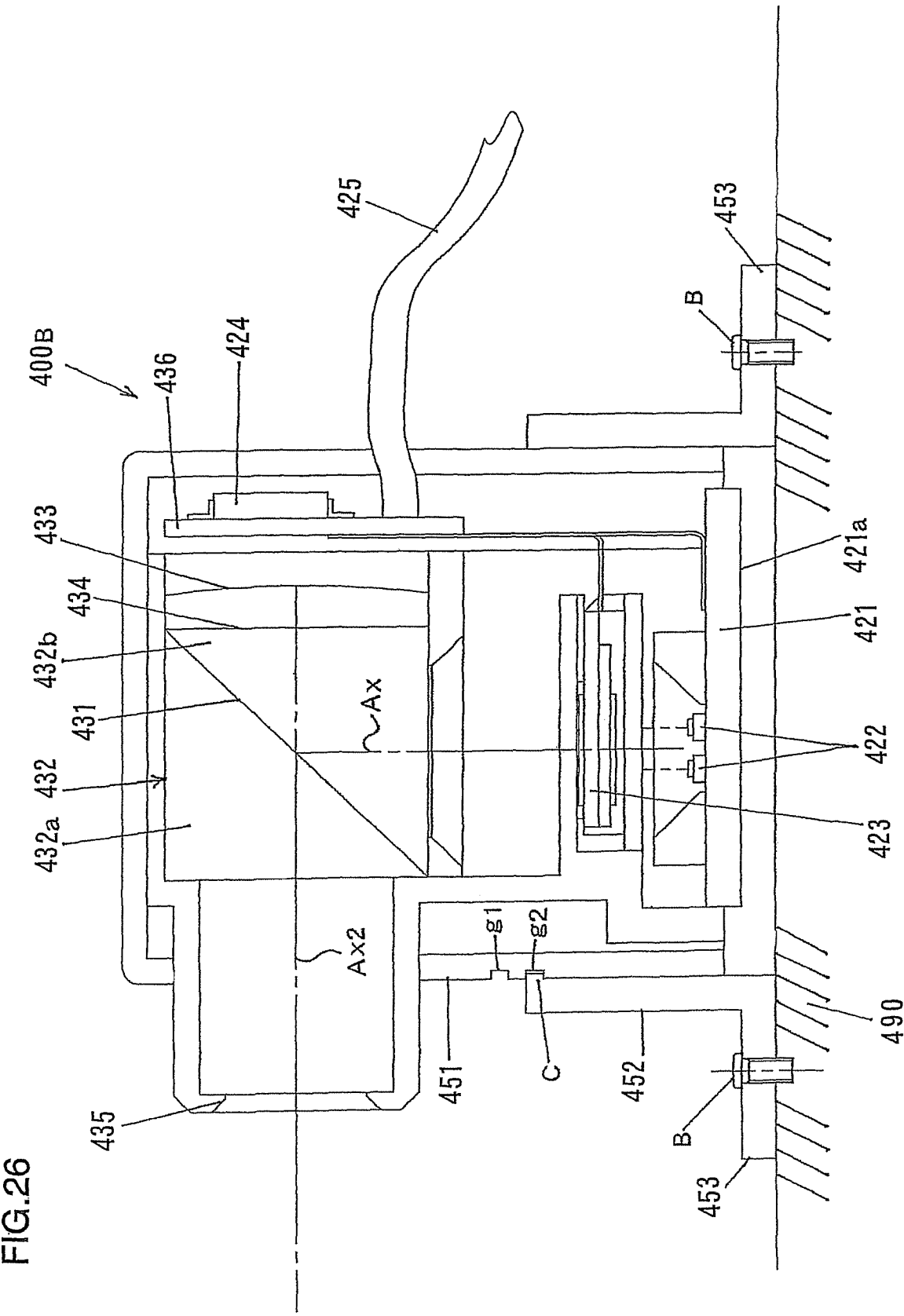
FIG. 26 is a sectional view of the liquid crystal projector achieved in the seventh embodiment.

As the first casing 451 (optical block) in the state shown in FIG. 25 slides upward, the projecting portion C having interlocked with the groove portion g1 becomes disengaged from the groove portion g1 and clicks into and becomes interlocked with a groove portion g2 formed at a position lower than the groove portion g1, as shown in FIG. 26. FIG. 26 is a sectional view of the projector 400B with the second casing 452 holding the first casing 451 so as to assure the presence of the layer of air between the metal substrate 421 and the placement surface 490. Thus, if the heat needs to be released into an air layer from the metal substrate 421, an air release space can be formed with ease without having to use any tools.

The following operational effects can be achieved in the seventh embodiment explained above.

(1) The projector 400B can be placed on the placement surface 490 with an air layer formed between the metal substrate 421 at which the LEDs 422 are mounted and the placement surface 490 (see FIG. 26). As a result, the heat can be released to the air layer reliably without directly exposing the placement surface 490 to the heat. As in the fifth embodiment, a compact and power efficient projector 400B is achieved.

(2) When the heat can be directly released to the placement surface 490, the lower surface 421a of the metal substrate 421 is allowed to achieve surface contact with the placement surface 490 (see FIG. 25) and, in such a case, the heat can be efficiently released to the placement surface 490.

(3) Since the projector 400B can be switched from the state in (1) above to the state in (2) above and vice versa simply by sliding the first casing 451 (optical block) along the inner surface of the second casing 452 in the direction extending along the optical axis Ax, the projector 400B assures ease of use.

(4) As in the sixth embodiment, the area of the metal substrate 421 where the temperature rises to the highest level, i.e., the area directly under the LEDs 422, is positioned within the space enclosed by the second casing 452 and the placement surface 490 so as to ensure that the user does not inadvertently touched the heated area and experience discomfort.

(5) As in the sixth embodiment, the central line (the optical axis Ax) of the light flux emitted from the LEDs 420 is set substantially perpendicular to the placement surface 490 and the light flux is bent at the PBS 432 for projection. Since this assures a sufficient height for the projection light axis, a partial eclipse of the projection light flux at the placement surface 490 is prevented.

Another groove portion may be formed at a position further downward relative to the groove portion g2 at the outer surface of the first casing 451. This will further widen the clearance formed between the metal substrate 421 and the installation surface 492 to increase the rate of heat release. By selecting the optimal groove portion to be interlocked with the projecting portion C, the size of the clearance can be adjusted in correspondence to the required rate of heat release.

The structure illustrated in FIG. 25 may include an elastic sheet achieving a high level of thermal conductivity inserted between the lower surface 421a of the metal substrate 421 and the placement surface 490. The elastic sheet will absorb any surface irregularities that may be present at the placement surface 490 to assure full contact, which will improve the level of thermal conductivity.

Eighth Embodiment

Figure 27:
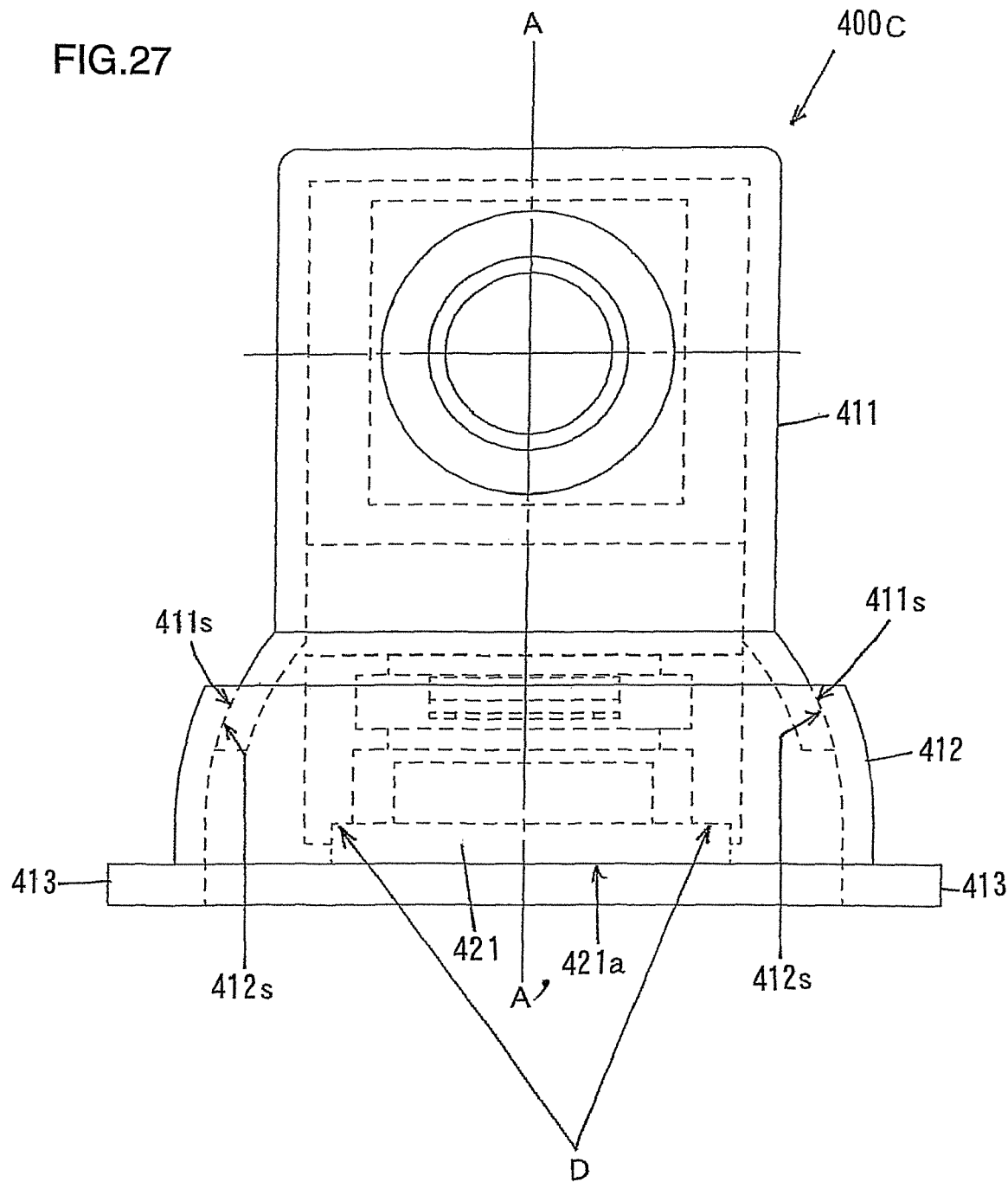
FIG. 27 is a front view of the liquid crystal projector achieved in an eighth embodiment.
Figure 28:
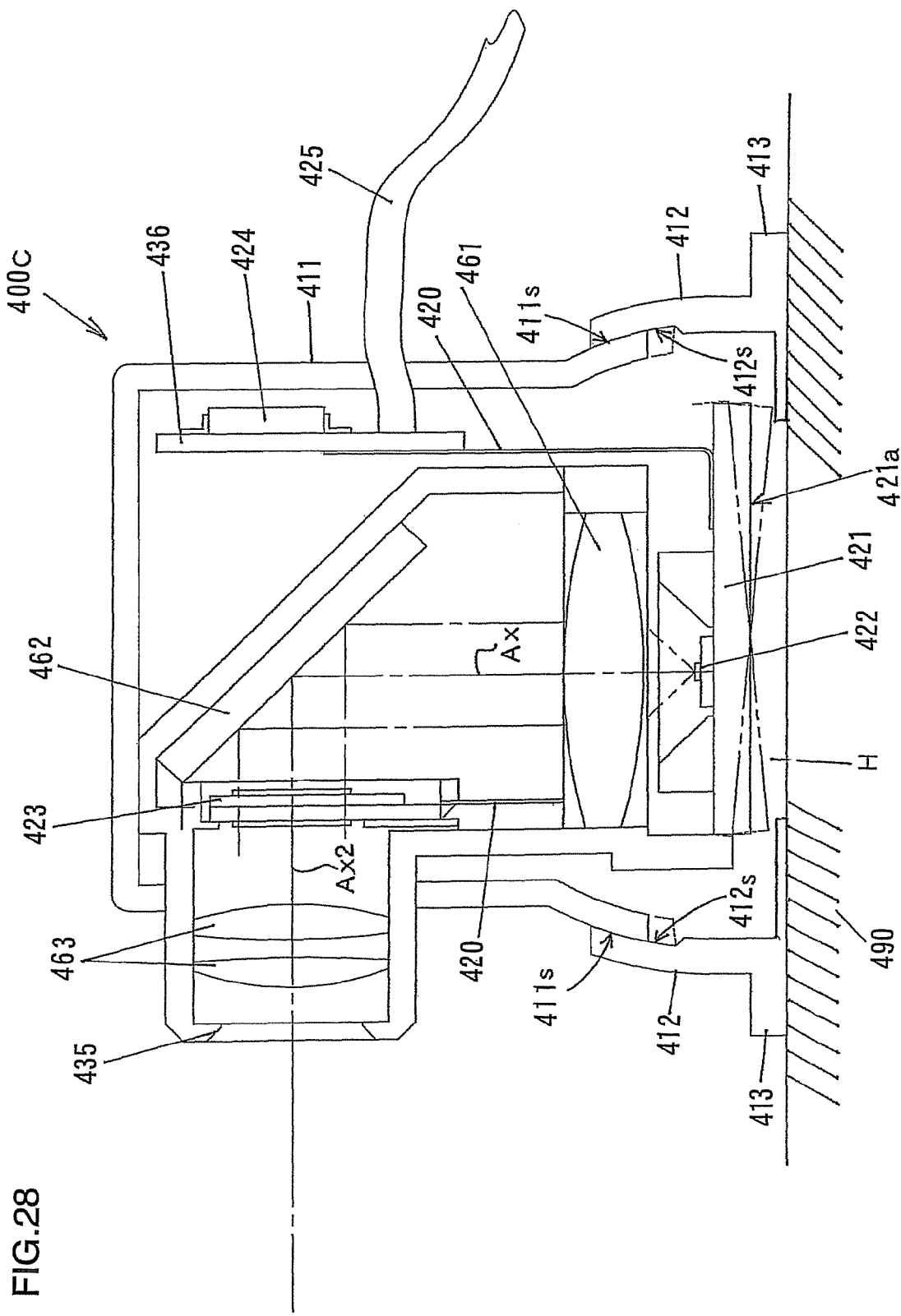
FIG. 28 is a sectional view of FIG. 27.

FIG. 27 is a front view of a liquid crystal projector 400C achieved in the eighth embodiment and FIG. 28 is a sectional view of the projector taken along line A-A'. In FIGS. 27 and 28, the same reference numerals are assigned to members identical to those in FIGS. 23 and 24 in reference to which the sixth embodiment has been explained to preclude the necessity for a repeated explanation thereof. As does the projector achieved in the sixth embodiment, the projector 400C comprises a first casing 411 in which an optical block is housed and a second casing 412 used as a seat for the first casing 411.

The structure of the optical block housed inside the first casing 411 is explained. It differs from the optical block in the sixth embodiment in that the light flux emitted from an LED 422 is bent at a reflecting mirror 462 (light path altering member), in that the light flux emitted from the LEDs 422 is guided to the reflecting mirror 462 via a condensing member 461, in the position at which the liquid crystal panel 423 is disposed and in that the projection optical system is constituted by using a refractive lens 463.

The light flux emitted from the LEDs 422 along the upward direction in FIG. 28 is condensed at the condensing member 461 and is guided to the reflecting mirror 462. The light reflected at the reflecting mirror 462 then advances to the left. The condensing member 461 may be, for instance, a Fresnel lens formed by using a resin material and has an additional function of dividing the space inside the optical block into separate spaces, i.e., a space toward the LEDs 422 and a space toward the liquid crystal panel 423.

The reflected light flux having advanced to the left is transmitted through the liquid crystal panel 423 and further advances to the left before it is projected to the outside via the refractive lens 463 and the aperture 435. Thus, the optical image formed at the liquid crystal panel 423 is projected toward a screen (not shown) or the like.

In addition to operational effects similar to those of the sixth embodiment, the eighth embodiment described above achieves another operational effect in that since the space inside the optical block is divided into the space toward the LEDs 422 and the space toward the liquid crystal panel 423, the heat generated at the LEDs 422 is not readily transferred to other members (in particular, the liquid crystal panel 423) constituting the optical block.

While an explanation is given above in reference to the sixth through eighth embodiments on an example in which the transmission-type liquid crystal panel 423 constitutes the optical image forming element, a reflective liquid crystal (LCOS) panel may be used instead of a transmission-type liquid crystal panel.

In addition, while an explanation is given above on an example in which the LEDs 422 is used as the light source in the projector, the present invention may also be adopted in illuminating devices other than projectors that use LEDs as light sources, such as an illuminating device that includes an LED, a camera having an illuminating device constituted with an LED and a camera having an AF auxiliary light source constituted with an LED.

While an explanation is given above on an example in which the light emitting element is an LED, the present invention may also be adopted in an illuminating device that employs an LD (a semiconductor laser).

In the sixth through eighth embodiments explained above, the light emitting element is mounted at a metal mounting substrate, the mounting substrate is disposed substantially parallel to the installation surface on which the illuminating device is installed and the mounting substrate is covered with a casing by ensuring that at least part of the rear side of the surface at which the light emitting element is mounted, facing opposite the installation surface, is exposed. As a result, a compact illuminating device and a compact projector device with a high level of heat releasing performance can be provided without having to use a Peltier element or the like.

The above described embodiments are examples and various modifications can be made without departing from the spirit and scope of the invention.

What is claimed is:

1. A projector device to be mounted in an electronic apparatus, comprising:
    a first member constituted of a thermally conductive material, at which a light emitting device is disposed;
    a light modulating member that modulates light originating from the light emitting device;
    a projection optical system that projects an image formed with the light modulated by the light modulating member;
    a second member constituted of a material with a lower level of thermal conductivity compared to the first member, at which the first member and the light modulating member are disposed; and
    a third member constituted of a material with a high level of thermal conductivity compared to the second member, that supports the second member and the projection optical system as an integrated unit and comes into surface contact with the first member.

2. A projector device to be mounted in an electronic apparatus, according to claim 1, wherein:
    the second member is formed in a prismatic shape so as to enclose a passing light flux; and
    the third member is bent so as to fit along an outer surface of the prism-shaped second member.

3. A projector device to be mounted in an electronic apparatus according to claim 2, wherein:
    the first member is disposed at a position of a bottom surface of the prism-shaped second member; and
    the third member comes into surface contact with the first member at the position of the bottom surface.

4. A projector device to be mounted in an electronic apparatus according to claim 1, wherein:
    the second member holds the light modulating member at a position away from the third member.

5. A projector device to be mounted in an electronic apparatus according to claim 1, wherein:
    the third member comprises a mounting portion to be used to mount the projector device in the electronic apparatus.

6. A projector device to be mounted in an electronic apparatus according to claim 1, further comprising:
    a separating portion disposed at the second member, that separates a space toward the first member from a space toward the light modulating member.

7. A projector device to be mounted in an electronic apparatus according to claim 1, wherein:
    the light emitting device is an LED.

* * * * *